United States Patent
Muramatsu et al.

(10) Patent No.: US 11,001,653 B2
(45) Date of Patent: May 11, 2021

(54) OPTICAL FILM, POLARIZING PLATE, AND IMAGE DISPLAY DEVICE

(71) Applicant: FUJIFILM Corporation, Tokyo (JP)

(72) Inventors: Ayako Muramatsu, Kanagawa (JP); Hiroshi Sato, Kanagawa (JP); Kengo Saito, Kanagawa (JP); Takashi Komiyama, Kanagawa (JP); Keita Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 15/922,212

(22) Filed: Mar. 15, 2018

(65) Prior Publication Data

US 2018/0201701 A1   Jul. 19, 2018

Related U.S. Application Data

(63) Continuation of application No. PCT/JP2016/078777, filed on Sep. 29, 2016.

(30) Foreign Application Priority Data

Sep. 30, 2015   (JP) .............................. JP2015-194918

(51) Int. Cl.
   *C08F 20/30* (2006.01)
   *G02B 5/30* (2006.01)
   (Continued)

(52) U.S. Cl.
   CPC .......... *C08F 20/30* (2013.01); *C09K 19/3804* (2013.01); *G02B 5/3025* (2013.01);
   (Continued)

(58) Field of Classification Search
   CPC . C08F 20/30; C09K 19/3804; C09K 2323/03; C09K 2323/035; G02B 5/30;
   (Continued)

(56) References Cited

U.S. PATENT DOCUMENTS

2005/0092965 A1   5/2005   Ishizaki et al.
2008/0096115 A1*  4/2008   Tanabe ................ C07D 209/86
                                                              430/7
(Continued)

FOREIGN PATENT DOCUMENTS

EP   1793246 A1   6/2007
JP   2005-084271 A   3/2005
(Continued)

OTHER PUBLICATIONS

Notification of Reasons for Refusal, issued by the Japanese Patent Office dated Mar. 5, 2019, in connection with Japanese Patent Application No. 2017-543540.

(Continued)

*Primary Examiner* — Ruiyun Zhang

(74) *Attorney, Agent, or Firm* — Edwards Neils LLC; Jean C. Edwards, Esq.

(57) ABSTRACT

An object of the present invention is to provide an optical film having an optically anisotropic layer having excellent durability, and a polarizing plate and an image display device using the same. This optical film of the present invention is an optical film at least having an optically anisotropic layer, in which the optically anisotropic layer is a layer obtained by polymerizing a polymerizable liquid crystal composition containing a predetermined liquid crystal compound and a polymerization initiator, and the optically anisotropic layer has a density of 1.20 $g/cm^3$ or more and a crosslinking point density of 0.0016 $mol/cm^3$ or more.

17 Claims, 1 Drawing Sheet

(51) Int. Cl.
*C09K 19/38* (2006.01)
*G02F 1/1335* (2006.01)

(52) U.S. Cl.
CPC ......... *G02B 5/3041* (2013.01); *G02B 5/3083* (2013.01); *G02B 5/3091* (2013.01); *G02F 1/133528* (2013.01); *C09K 2219/03* (2013.01); *C09K 2323/03* (2020.08); *C09K 2323/035* (2020.08)

(58) Field of Classification Search
CPC ..... G02B 5/3025; G02B 5/091; Y10T 428/10; Y10T 428/1036; G02F 1/133528; G02F 1/13363; G02F 1/133633; G02F 2001/133633
USPC ........... 428/1.1, 1.3, 1.33; 349/88, 117, 118; 526/257; 544/255
See application file for complete search history.

(56) References Cited

U.S. PATENT DOCUMENTS

2015/0079380 A1\* 3/2015 Muramatsu ........ C09K 19/3447 428/220
2015/0175564 A1 6/2015 Sakamoto et al.

FOREIGN PATENT DOCUMENTS

| JP | 2010-031223 A | 2/2010 |
| JP | 2010-085794 A | 4/2010 |
| JP | 2010-152217 A | 7/2010 |
| JP | 2012-083761 A | 4/2012 |
| JP | 2013-120350 A | 6/2013 |
| JP | 2014-077068 A | 5/2014 |
| WO | 2014/010325 A1 | 1/2014 |
| WO | 2014/132978 A1 | 9/2014 |

OTHER PUBLICATIONS

Notification of Reasons for Refusal, issued by the Japanese Patent Office dated Oct. 1, 2019, in connection with Japanese Patent Application No. 2017-543540.
International Search Report issued in PCT/JP2016/078777 dated Jan. 10, 2017.
Written Opinion issued in PCT/JP2016/078777 dated Jan. 10, 2017.
International Preliminary Report on Patentability issued by WIPO dated Apr. 12, 2018, in connection with International Patent Application No. PCT/JP2016/078777.

\* cited by examiner

OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2016/078777 filed on Sep. 29, 2016, which was published under PCT Article 21(2) in Japanese, and which claims priority under 35 U.S.C. § 119(a) to Japanese Patent Application No. 2015-194918 filed on Sep. 30, 2015. The above applications are hereby expressly incorporated by reference, in their entirety, into the present application.

BACKGROUND OF THE INVENTION

1. Field of the Invention

The present invention relates to an optical film, a polarizing plate, and an image display device.

2. Description of the Related Art

Optical films such as an optical compensation sheet and a phase difference film are used for various image display devices to eliminate image coloration and to broaden the viewing angle.

Stretched birefringent films have been employed as optical films. However, in recent years, instead of stretched birefringent films, the use of optical films having optically anisotropic layers formed of liquid crystal compounds has been proposed.

As such an optical film, for example, JP2010-031223A discloses an optical film obtained by polymerizing a compound which contains a predetermined group and a polymerizable group ([claim 12]).

SUMMARY OF THE INVENTION

The present inventors have conducted investigations on the optical film disclosed in JP2010-031223A and have found that, in a case where an optically anisotropic layer to be formed is exposed to a high temperature and high humidity environment, there is a problem in durability that the birefringence index of the optically anisotropic layer changes depending on polymerization conditions such as the kind of a polymerizable liquid crystal compound and a polymerization initiator to be used and the curing temperature thereof.

Here, an object of the present invention is to provide an optical film having an optically anisotropic layer having excellent durability, and a polarizing plate and an image display device using the same.

As a result of intensive investigations to achieve the above object, the present inventors have found that in a case of using a liquid crystal compound having a predetermined structure, satisfactory durability is obtained by setting the density and the crosslinking point density of an optically anisotropic layer to be formed to predetermined values or greater, and thus have completed the present invention.

That is, it has been found that the above object can be achieved by adopting the following configurations.

[1] An optical film comprising at least: an optically anisotropic layer, in which the optically anisotropic layer is a layer obtained by polymerizing a polymerizable liquid crystal composition containing a liquid crystal compound represented by Formula (1) and a polymerization initiator, and the optically anisotropic layer has a density of 1.20 g/cm$^3$ or more and a crosslinking point density of 0.0016 mol/cm$^3$ or more.

[2] The optical film according to [1], in which the optically anisotropic layer has a density of 1:25 g/cm$^3$ or more.

[3] The optical film according to [1] or [2], in which the optically anisotropic layer satisfies Expression (I), $$0.75 \leq Re(450)/Re(550) \leq 1.00 \tag{I}$$

in Expression (I), Re(450) represents an in-plane retardation of the optically anisotropic layer at a wavelength of 450 nm, and Re(550) represents an in-plane retardation of the optically anisotropic layer at a wavelength of 550 nm.

[4] The optical film according to any one of [1] to [3], in which the polymerizable liquid crystal composition contains a polymerizable compound other than the liquid crystal compound represented by Formula (1).

[5] The optical film according to [4], in which the polymerizable compound is a compound having a mesogen group.

[6] The optical film according to [5], in which the compound having a mesogen group has at least one ring structure selected from the group consisting of a benzene ring and a cyclohexane ring.

[7] The optical film according to [5] or [6], in which the number of cyclohexane rings in the compound having a mesogen group is 2 or less.

[8] The optical film according to [6] or [7], in which the ring structure has a substituent having a van der Waals volume of 0.30 Å$^3$ or less.

[9] The optical film according to any one of [1] to [8], in which the polymerization initiator is an oxime type polymerization initiator.

[10] A polarizing plate comprising: the optical film according to any one of [1] to [9]; and a polarizer.

[11] An image display device comprising: the optical film according to any one of [1] to [9]; or the polarizing plate according to [10].

According to the present invention, it is possible to provide an optical film having an optically anisotropic layer having excellent durability, and a polarizing plate and an image display device using the same.

DESCRIPTION OF THE PREFERRED EMBODIMENTS

Hereinafter, the present invention will be described in detail.

The description of the constitutional requirements described below is made on the basis of representative embodiments of the present invention, but it should not be construed that the present invention is limited to those embodiments, In this specification, numerical value ranges expressed by the term "to" mean that the numerical values described before and after "to" are included as a lower limit and an upper limit, respectively.

[Optical Film]

An optical film of the present invention is an optical film having at least an optically anisotropic layer, the optically anisotropic layer is a layer obtained by polymerizing a polymerizable liquid crystal composition containing a liquid crystal compound represented by Formula (1) and a polymerization initiator, and the optically anisotropic layer has a density of 1.20 g/cm$^3$ or more and a crosslinking point density of 0.0016 mol/cm$^3$ or more, The present inventors have found that in a case of using a liquid crystal compound represented by Formula (1) as described above, by setting the density of the optically anisotropic layer to 1.20 g/cm$^3$ or more and setting the crosslinking point density to 0.0016 mol/cm$^3$ or more, the durability of the optically anisotropic layer becomes satisfactory.

First, an ester bond included in the structure of the liquid crystal compound is present even after polymerization, that is, after the optically anisotropic layer is formed, but the present inventors assume that a part of the liquid crystal compound fixed by a polymerizable group is separated to have mobility through a hydrolysis reaction of a hydrolyzable bond such as this ester bond in a high temperature and high humidity environment and a birefringence index is changed.

Therefore, in the present invention, it is considered that this is because by setting the density of the optically anisotropic layer to 1.20 g/cm$^3$ or more, even in a high temperature and high humidity environment, moisture is hardly allowed to penetrate into the optically anisotropic layer, and by setting the crosslinking point density of the optically anisotropic layer to 0.0016 mol/cm$^3$ or more, even in a case where moisture penetrates into the optically anisotropic layer, a structure separated in the optically anisotropic layer by hydrolysis can be simplified.

Figure 1A:
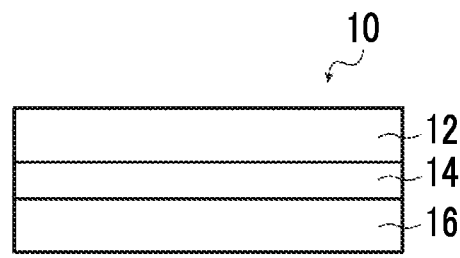
FIG. 1A is a cross-sectional view schematically showing an example of an optical film according to the present invention.
Figure 1B:
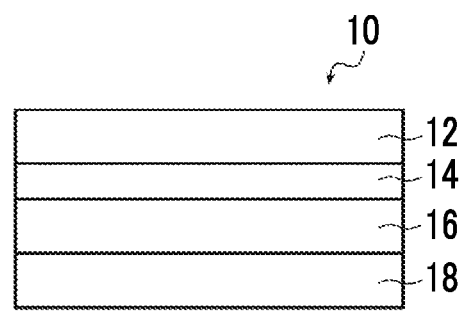
FIG. 1B is a cross-sectional view schematically showing another example of the optical film according to the present invention.
Figure 1C:
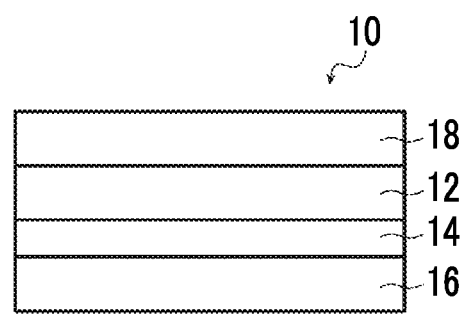
FIG. 1C is a cross-sectional view schematically showing still another example of the optical film according to the present invention.

FIGS. 1A to 1C (hereinafter, these are simply abbreviated as "FIG. 1") are cross-sectional views schematically showing examples of the optical film according to the present invention, respectively.

FIG. 1 is a schematic view and the thicknesses relationship and positional relationship between the respective layers or the like do not necessarily coincide with actual ones. Any of the support, alignment film, and hard coat layer shown in FIG. 1 is an arbitrary constitutional member.

An optical film 10 shown in FIG. 1 has a support 16, an alignment film 14, and an optically anisotropic layer 12 in this order.

In addition, the optical film 10 may have a hard coat layer 18 on the side of the support 16 opposite to the side on which the alignment film 14 is provided as shown in FIG. 1B and may have a hard coat layer 18 on the side of the optically anisotropic layer 12 opposite to the side on which the alignment film 14 is provided as shown in FIG. 1C.

Hereinafter, various members used for the optical film of the present invention will be described in detail.

[Optically Anisotropic Layer]

The optically anisotropic layer of the optical film of the present invention is a layer obtained by polymerizing a polymerizable liquid crystal composition containing a liquid crystal compound represented by Formula (1) and a polymerization initiator and the optically anisotropic layer has a density of 1.20 g/cm$^3$ or more and a crosslinking point density of 0.0016 mol/cm$^3$ or more.

Herein, the density of the optically anisotropic layer refers to density measured by an X-ray reflectivity method, and refers to a value calculated by performing measurement using an X-ray diffraction apparatus for thin film structure evaluation (ATX-G, manufactured by Rigaku Corporation) under the following conditions and obtaining a spectrum.

<Conditions>

X-ray source: CuK-α
2-crystal monochromator: Ge(220)
Incidence slit: 0.05 mm=10 mm
Light receiving slit: 0.1 mm×10 mm
Scan speed: 0.1 degrees/minutes
Scan interval: 0.001 degrees In addition, the crosslinking point density of the optically anisotropic layer refers to a value defined by the following equation.

Crosslinking point density of optically anisotropic layer=(number of polymerizable groups of each component included in polymerizable liquid crystal composition/molecular weight of above each component)×(reaction rate of polymerizable groups)×(density of optically anisotropic layer)

Herein, in the above equation, the "number of polymerizable groups of each component included in polymerizable liquid crystal composition/molecular weight of above each component" refers to a total value obtained by multiplying each value calculated for each component, by the compositional ratio of each component, that is, the mass ratio of each component with respect to a total mass of components having a polymerizable group. For example, in a case where a compound A and a compound B are contained as components, in the above equation, the "number of polymerizable groups of each component included in polymerizable liquid crystal composition/molecular weight of above each component" is calculated from [{number of polymerizable groups of compound A/molecular weight of compound A×compositional ratio of compound A (mass of compound A/(total mass of compound A and compound B)}+{number of polymerizable groups of compound B/molecular weight of compound B×compositional ratio of compound B (mass of compound B/(total mass of compound A and compound B)}]. In addition, each component refers to a component that is not volatilized by alignment treatment through heating and a volatile component such as a solvent is excluded.

Further, in the above equation, the "reaction rate of polymerizable groups" refers to a rate of polymerizable groups consumed by polymerization in a case of forming an optically anisotropic layer among all polymerizable groups of each component having a polymerizable group included in the polymerizable liquid crystal composition, and for example, in a case where a polymerizable group is an acryloyl group or a methacryloyl group (hereinafter, abbreviated as "(meth)acryloyl group"), the reaction rate of the polymerizable groups can be calculated by infrared spectroscopy (IR) measurement. Specifically, measurement is performed by using a Fourier transform infrared (FT-IR) spectrometer [for example, Nicolet 6700 (manufactured by Thermo Fisher Science) or the like] and tile reaction rate of the (meth)acryloyl group is calculated from the C=C group-derived peak surface area of the obtained spectrum. For the calculation of the reaction rate, C=C group-derived absorption, that is, a reduction in the area of the peak at any of 810 cm$^{-1}$, 1,410 cm$^{-1}$, and 1,635 cm$^{-1}$ is calculated based on an area of 2,215 cm$^{-1}$ of absorption of a nitrile group of a liquid crystal component which is not changed before and after reaction.

<Liquid Crystal Compound>

The polymerizable liquid crystal composition forming the optically anisotropic layer includes the liquid crystal compound represented by Formula (1).

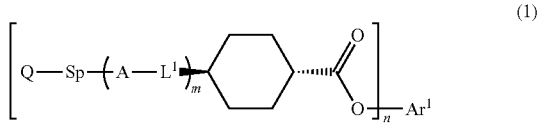

(1)

Herein, in Formula (1), $Ar^1$ represents an n-valent aromatic group, $L^1$ represents a single bond, —COO—, or —OCO—, A represents an aromatic ring having 6 or more carbon atoms or a cycloalkylene ring having 6 or more carbon atoms, Sp represents a single bond, a linear or branched alkylene group having 1 to 12 carbon atoms, or a divalent linking group in which one or more —CH$_2$— groups that constitute a linear or branched alkylene group having 1 to 12 carbon atoms are substituted with —O—, —S—, —NH—, —N(Q)-, or —CO—, and Q represents a polymerizable group, m represents an integer of 0 to 2, and n represents an integer of 1 or 2.

Herein, all of L, A, Sp, and Q, a plurality of which are provided depending on the number of m or n, may be the same or different from each other.

In Formula (1), an aromatic group represented by $Ar^1$ refers to a group having a ring having aromaticity and for example, an n-valent group having at least one aromatic ring selected from the group consisting of an aromatic hydrocarbon ring and an aromatic heterocyclic ring may be used. Herein, examples of the aromatic hydrocarbon ring include a benzene ring, a naphthalene ring, an anthracene ring, and a phenanthroline ring, and examples of the aromatic heterocyclic ring include a furan ring, a pyrrole ring, a thiophene ring, a pyridine ring, a thiazole ring, and a benzothiazole ring. Among these, a benzene ring, a thiazole ting, and a benzothiazole ring are preferable.

In addition, in Formula (1), examples of an aromatic ring having 6 or more carbon atoms represented by A includes the examples of the aromatic ring included in $Ar^1$ described above, and among these, a benzene ring (for example, 1,4-phenyl group) is preferable. Similarly, in Formula (1), examples of a cycloalkylene ring having 6 or more carbon atoms represented by A include a cyclohexane ring, and a cyclohexene ring. Among these, a cyclohexane ring (for example, cyclohexane-1,4-diyl group) is preferable.

Further, in Formula (1), examples of a polymerizable group represented by Q include a (meth)acryloyl group, a vinyl group, a styryl group, and an allyl group. The term "(meth)acryloyl group" refers to an acryloyl group or a methacryloyl group.

In the present invention, the liquid crystal compound represented by Formula (1) is preferably a compound having at least three ring structures selected from the group consisting of a benzene ring and a cyclohexane ring for the reason that smectic properties are easily exhibited by pseudo phase separation of the rigid mesogenic moiety and the flexible side chain and sufficient rigidity is exhibited.

In the present invention, as the liquid crystal compound represented by Formula (1), for the reason for further improving the durability of the optically anisotropic layer, a compound having two or more polymerizable groups (for example, (meth)acryloyl group, vinyl group, styryl group, and allyl group) is preferable.

Further, in the present invention, the liquid crystal compound represented by Formula (1) is preferably a liquid crystal compound exhibiting reverse wavelength dispersion.

Herein, in this specification, the liquid crystal compound exhibiting "reverse wavelength dispersion" means that at the time of measurement of an in-plane retardation (Re) value at a specific wavelength (visible light range) of a phase difference film prepared using the liquid crystal compound, as the measurement wavelength increases, the Re value becomes equal or higher.

As the liquid crystal pound exhibiting reverse wavelength dispersion, $Ar^1$ in Formula (1) is preferably a compound which is a divalent aromatic ring group represented by Formula (II-1), (II-2), (II-3), or (II-4).

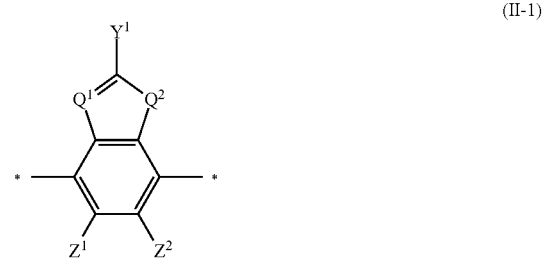

(II-1)

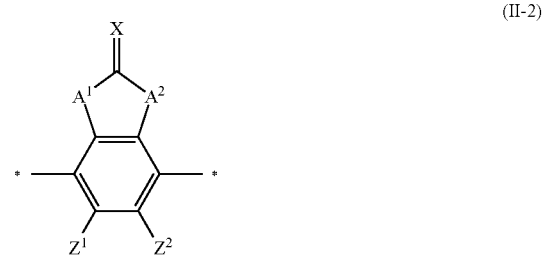

(II-2)

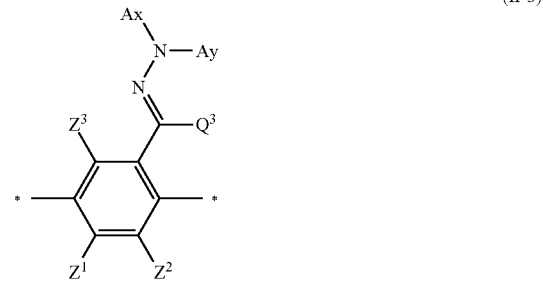

(II-3)

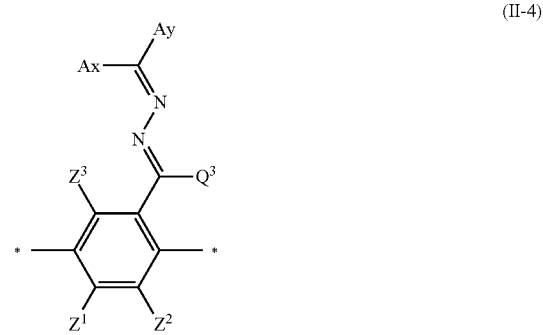

(II-4)

In Formulae (II-1) to (II-4), $Q^1$ represents N or CH, $Q^2$ represents —S—, —O—, or —NR$^{11}$—, $R^{11}$ represents a hydrogen atom or an alkyl group having 1 to 6 carbon atoms, and $Y^1$ represents an aromatic hydrocarbon group having 6 to 12 carbon atoms or an aromatic heterocyclic group having 3 to 12 carbon atoms. The aromatic hydrocarbon group and the aromatic heterocyclic group may have a substituent.

Specific examples of the alkyl group having 1 to 6 carbon atoms represented by $R^{11}$ include a methyl group, an ethyl group, a propyl group, an isopropyl group, a n-butyl group, are isobutyl group, a sec-butyl group, a tert-butyl group, a n-pentyl group, and a n-hexyl group.

Examples of the aromatic hydrocarbon group having 6 to 12 carbon atoms represented by $Y^1$ include aryl groups such as a phenyl group, a 2,6-diethylphenyl group, and a naphthyl group.

Examples of the aromatic heterocyclic group having 3 to 12 carbon atoms represented by $Y^1$ include heteroaryl groups such as a thienyl group, a thiazolyl group, a furyl group, and a pyridyl group.

Examples of the substituent that $Y^1$ may have include an alkyl group, an alkoxy group, and a halogen atom. As the alkyl group, for example, a linear, branched, or cyclic alkyl group having 1 to 18 carbon atoms is preferable, an alkyl group having 1 to 8 carbon atoms (for example, a methyl group, an ethyl group, a propyl group, an isopropyl group, a n-butyl group, an isobutyl group, a sec-butyl group, a tort-butyl group, and a cyclohexyl group) is more preferable, and a methyl group or an ethyl group is still more preferable. As the alkoxy group, for example, an alkoxy group having 1 to 18 carbon atoms is preferable, an alkoxy group having 1 to 8 carbon atoms (for example, a methoxy group, an ethoxy group, a n-butoxy group, and a methoxy ethoxy group) is more preferable, and a methoxy group or an ethoxy group is still more preferable. Examples of the halogen atom include a fluorine atom, a chlorine atom, a bromine atom, and an iodine atom, and among these, a fluorine atom or a chlorine atom is preferable.

In addition, in Formulae (II-1) to (II-4), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, $-NR^{12}R^{13}$, or $-SR^{12}$, $Z^1$ and $Z^2$ may be bonded to each other to form an aromatic ring or an aromatic heterocyclic ring, and $R^{12}$ and $R^{13}$ each independently represent a hydrogen atom or an alkyl group having 1 to 6 carbon atoms.

As the monovalent aliphatic hydrocarbon group having 1 to 20 carbon atoms, an alkyl group having 1 to 15 carbon atoms is preferable and an alkyl group having 1 to 8 carbon atoms is more preferable. Specifically, a methyl group, an ethyl group, an isopropyl group, a tert-pentyl group (1,1-dimethylpropyl group), a test-butyl group, or a 1,1-dimethyl-3,3-dimethyl-butyl group is still more preferable and a methyl group, an ethyl group, or a tert-butyl group is particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclodecenyl group, a cycloheptenyl group, a cyclooctenyl group, a cyclodecenyl group, a cyclopentadienyl group, a cyclohexadienyl group, a cyclooctadienyl group, and cyclodecadiene; and polycyclic saturated hydrocarbon groups such as a bicyclo [2.2.1]heptyl group, a bicyclo[2.2.2]octyl group, a tricyclo [5.2.1.0$^{2,6}$]decyl group, a tricyclo[3.3.1.1$^{3,7}$]decyl group, a tetracyclo[6.2.1.1$^{3,6}$.0$^{2,7}$]dodecyl group, and an adamantyl group.

Specific examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly a phenyl group) is preferable.

Examples of the halogen atom include a fluorine atom, a chlorine atom, a bromine atom, and an iodine atom, and among these, a fluorine atom, a chlorine atom, or a bromine atom is preferable.

On the other hand, specific examples of the alkyl group having 1 to 6 carbon atoms represented by $R^{12}$ and $R^{13}$ include a methyl group, an ethyl group, a propyl group, an isopropyl group, a n-butyl group, an isobutyl group, a sec-butyl group, a tert-butyl group, and a n-pentyl group and a n-hexyl group.

In addition, in Formula (II-2), $A^1$ and $A^2$ each independently represent a group selected from the group consisting of $-O-$, $-NR^{21}-$, $-S-$, and $-CO-$, and $R^{21}$ represents a hydrogen atom or a substituent.

Examples of the substituent represented by $R^{21}$ include the same substituents that $Y^1$ may have in Formula (II-1).

In Formula (II-2), X represents a hydrogen atom or a non-metal atom of Groups 14 to 16 to winch a substituent may be bonded.

Examples of the non-metal atom of Groups 14 to 16 represented by X include an oxygen atom, a sulfur atom, a nitrogen atom having a substituent, and a carbon atom having a substituent. Examples of the substituent include the same substituents that $Y^1$ may have in Formula (II-1).

in Formulae (II-3) and (II-4), Ax represents an organic group having 2 to 30 carbon atoms and having at least one aromatic ring selected from the group consisting of an aromatic hydrocarbon ring and an aromatic heterocyclic ring.

In Formulae (II-3) and (II-4), Ay represents a hydrogen atom, an alkyl group having 1 to 6 carbon atoms which may have a substituent, or an organic group having 2 to 30 carbon atoms and having at least one aromatic ring selected from the group consisting of an aromatic hydrocarbon ring and an aromatic heterocyclic ring.

Herein, the aromatic rings in Ax and Ay may respectively have a substituent, Ax and Ay may be bonded to form a ring, and examples of Ax and Ay include ones described in paragraphs [0039] to [0095] of WO2014/010325A.

In addition, $Q^3$ represents a hydrogen atom or an alkyl group having 1 to 6 carbon atoms which may have a substituent.

Specific examples of the alkyl group having 1 to 6 carbon atoms represented by $Q^3$ include a methyl group, an ethyl group, a propyl group, an isopropyl group, a n-butyl group, an isobutyl group, a sec-butyl group, a tert-butyl group, and a n-pentyl group and a n-hexyl group. Examples of the substituent include the same substituents that $Y^1$ may have in Formula (II-1).

Preferable examples of the liquid crystal compounds represented by Formulae (II-1) to (II-4) are shown below. However, the present invention is not limited to these liquid crystal compounds. In the formulae, all 1,4-cyclohexylene groups are trans-1,4-cyclohexylene groups.

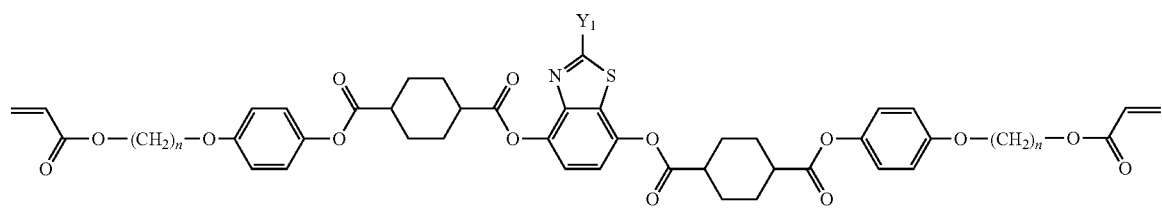
| No | Y1 | n |
|---|---|---|
| II-1-1 | phenyl (*) | 6 |
| II-1-2 | 4-CN-phenyl (*) | 6 |
| II-1-3 | 4-NO₂-phenyl (*) | 6 |
| II-1-4 | 4-pyridyl (*) | 6 |
| II-1-5 | 4-(styryl)phenyl (*) | 6 |
| II-1-6 | 4-NO₂-phenyl (*) | 11 |

-continued
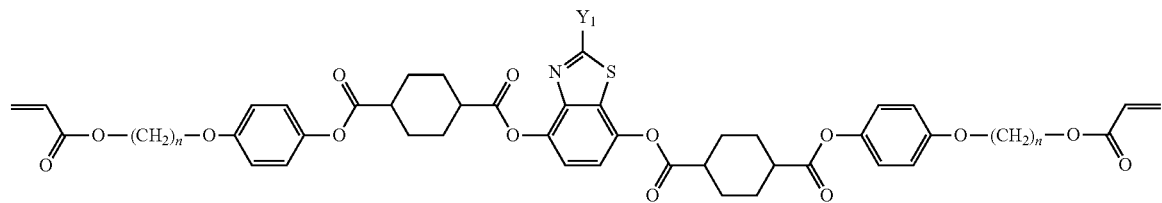
| No | Y1 | n |
|---|---|---|
| II-1-7 | 4-nitrophenyl | 8 |
| II-1-8 | 4-nitrophenyl | 4 |
| II-1-9 | thiophen-2-yl | 6 |
| II-1-10 | 3-methyl-4-nitrophenyl | 6 |
| II-1-11 | 4,6-dimethylbenzofuran-2-yl | 6 |
| II-1-12 | furan-2-yl | 6 |
| II-1-13 | 5-chlorothiophen-2-yl | 6 |

-continued
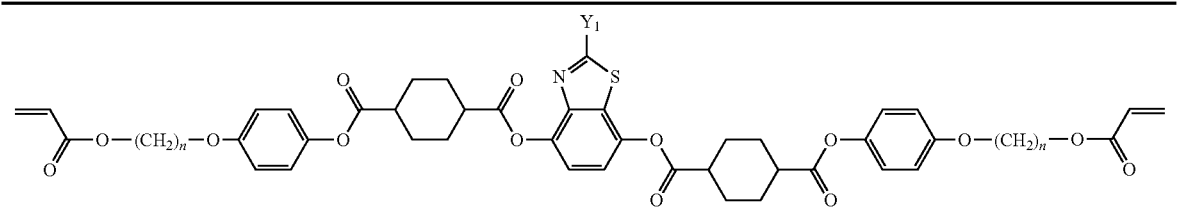
| No | Y1 | n |
|---|---|---|
| II-1-14 | 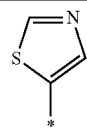 | 6 |
| II-1-15 | 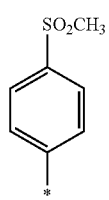 | 6 |
II-1-16
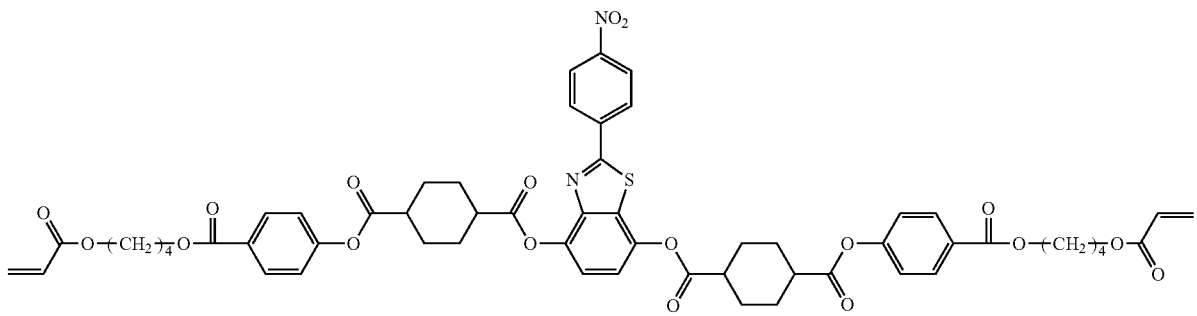
II-1-17
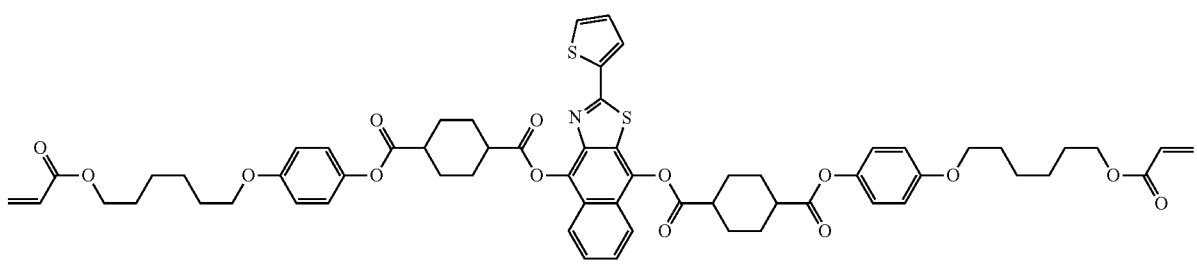
II-1-18
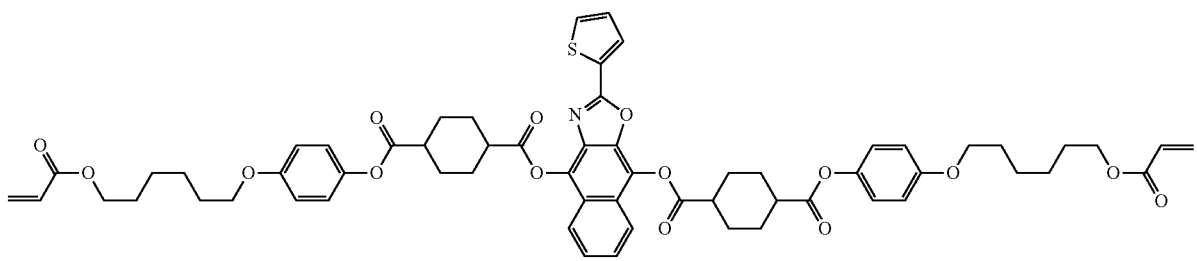

| No | X | R1 |
|---|---|---|
| II-2-1 | NC–CH(*)–CN | H |
| II-2-2 | NC–CH(*)–C(=O)–O–CH₃ | H |
| II-2-3 | NC–CH(*)–C(=O)–O–butyl | H |
| II-2-4 | NC–CH(*)–C(=O)–O–CH₂CH₂–O–C(CH₃)₂–OH | H |
| II-2-5 | NC–CH(*)–CN | CH₃ |
| II-2-6 | NC–CH(*)–CN | –C(CH₃)₃ |
| II-2-7 | S | H |

In the formulae, "*" represents a bonding position.

| No | Ax | Ay | Q2 |
|---|---|---|---|
| II-3-1 | benzothiazol-2-yl(*) | H | H |
| II-3-2 | benzoxazol-2-yl(*) | H | H |
| II-3-3 | naphthalen-1-yl(*) | H | H |

-continued
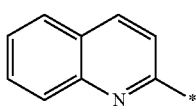 [SMILES: *c1ccc2ccccc2n1]
| No | Ax | Ay | Q2 |
|---|---|---|---|
| II-3-4 | Ph | Ph | H |
| II-3-5 | 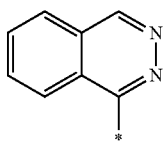 | H | H |
| II-3-6 | 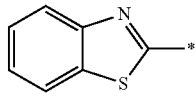 [SMILES: *c1nc2ccccc2s1] | H | H |
| II-3-7 | 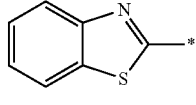 [SMILES: *c1nc2ccccc2s1] | CH₃ | H |
| II-3-8 | 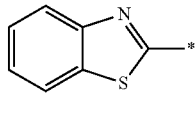 [SMILES: *c1nc2ccccc2s1] | C₄H₉ | H |
| II-3-9 | 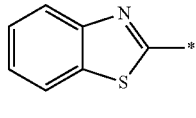 [SMILES: *c1nc2ccccc2s1] | C₆H₁₃ | H |
| II-3-10 | 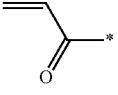 [SMILES: *C(=O)C=C] | 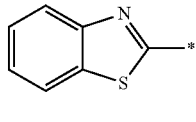 [SMILES: *c1nc2ccccc2s1] | H |
| II-3-11 | 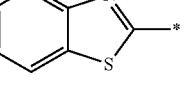 | 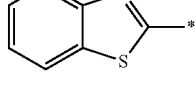 | H |
| II-3-12 | 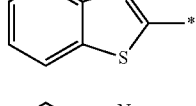 | CH₂CN | H |
| II-3-13 | 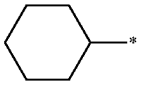 | 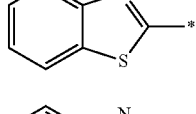 | H |
| II-3-14 | 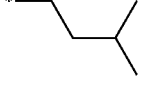 | 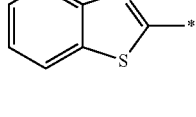 | H |
| II-3-15 |  | CH₂CH₂OH | H |

-continued
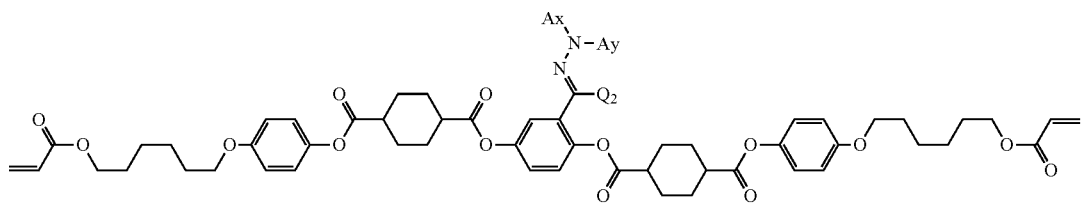
| No | Ax | Ay | Q2 |
|---|---|---|---|
| II-3-16 | (9H-fluoren-9-yl) | H | H |
| II-3-17 | (benzothiazol-2-yl) | CH₂CF₃ | H |
| II-3-18 | (benzothiazol-2-yl) | H | CH₃ |
| II-3-19 | (benzothiazol-2-yl) | (cyclohexylmethyl) | H |
| II-3-20 | (benzothiazol-2-yl) | (3-cyanopropyl) | H |
| II-3-21 | (benzothiazol-2-yl) | (benzyl) | H |
| II-3-22 | (benzothiazol-2-yl) | (4-methylphenylsulfonyl) | H |
| II-3-23 | (benzothiazol-2-yl) | (2-methoxyethoxymethyl) | H |
| II-3-24 | (benzothiazol-2-yl) | (butanoyl) | H |
| II-3-25 | (naphtho[1,2-d]thiazol-2-yl) | C₆H₁₃ | H |

II-3-26
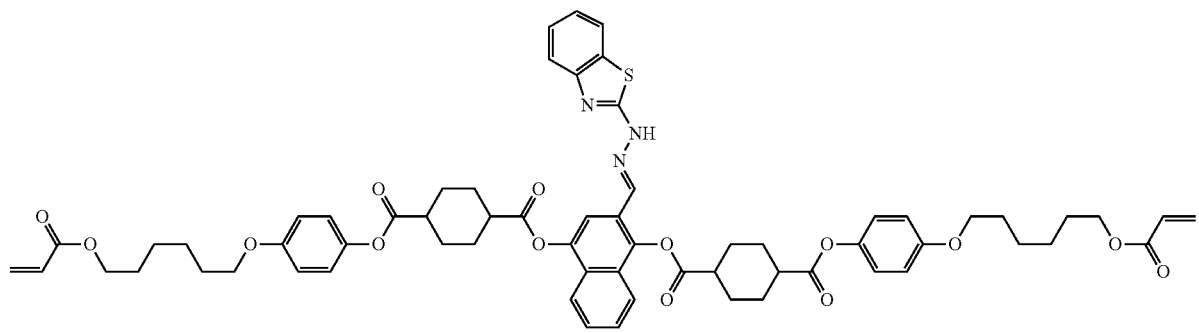
II-3-27
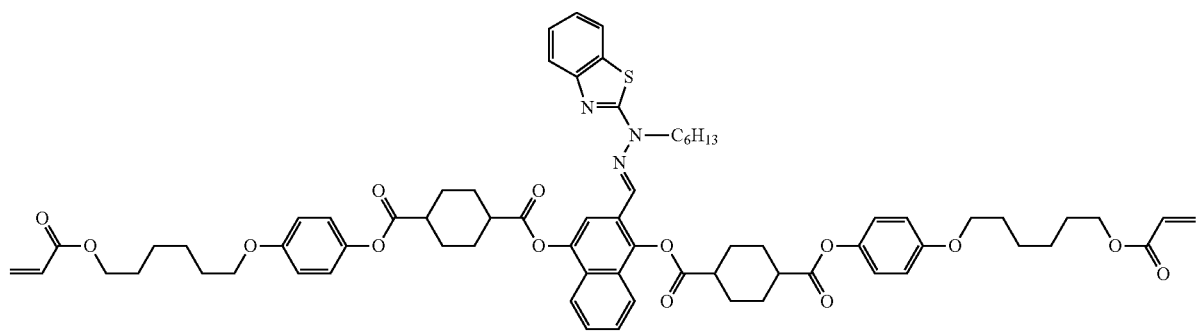
II-3-28
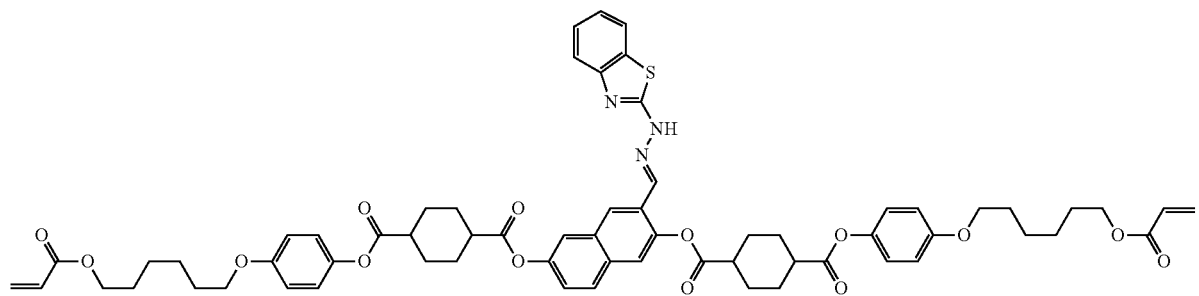
II-3-29
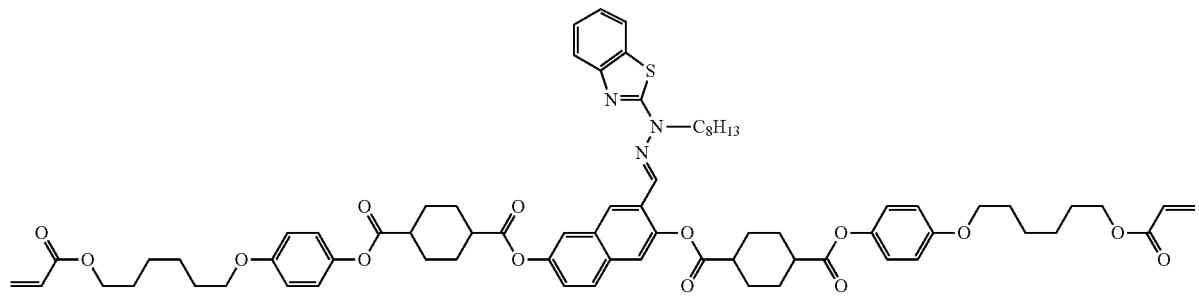

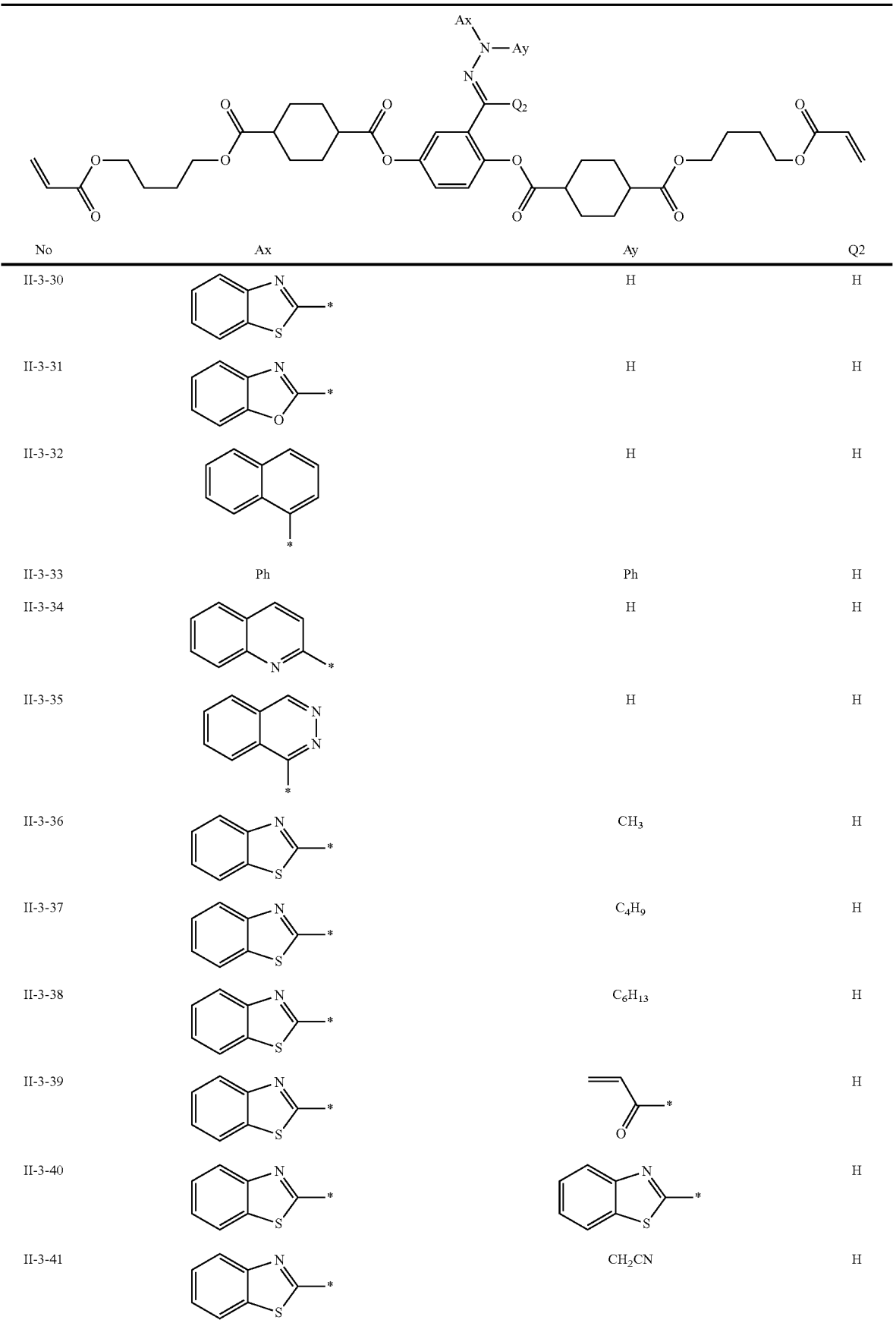

-continued

[Structural formula showing diacrylate compound with central phenyl ring bearing =N-N(Ax)(Ay) hydrazone group and Q2 substituent]

| No | Ax | Ay | Q2 |
|---|---|---|---|
| II-3-42 | benzothiazol-2-yl | cyclohexyl | H |
| II-3-43 | benzothiazol-2-yl | *-CH₂CH(CH₃)₂ (isobutyl) | H |
| II-3-46 | benzothiazol-2-yl | CH₂CH₂OH | H |
| II-3-45 | 9H-fluoren-9-yl | H | H |
| II-3-46 | benzothiazol-2-yl | CH₂CF₃ | H |
| II-3-47 | benzothiazol-2-yl | H | CH₃ |
| II-3-48 | benzothiazol-2-yl | cyclohexylmethyl | H |
| II-3-49 | benzothiazol-2-yl | *-CH₂CH₂CH₂CN | H |
| II-3-50 | benzothiazol-2-yl | benzyl | H |
| II-3-51 | benzothiazol-2-yl | *-S(O)₂-C₆H₄-CH₃ (p-tolylsulfonyl) | H |
| II-3-52 | benzothiazol-2-yl | *-CH₂OCH₂CH₂OCH₃ | H |

-continued
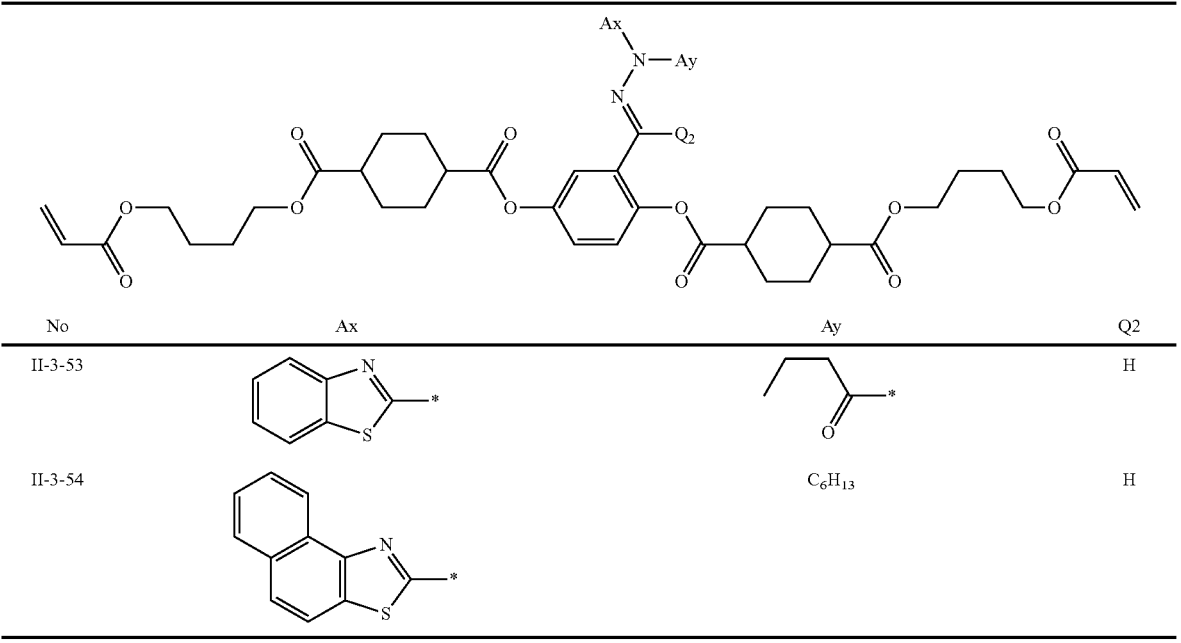
| No | Ax | Ay | Q2 |
|---|---|---|---|
| II-3-53 | benzothiazol-2-yl | propanoyl | H |
| II-3-54 | naphtho[1,2-d]thiazol-2-yl | C$_6$H$_{13}$ | H |
II-3-55
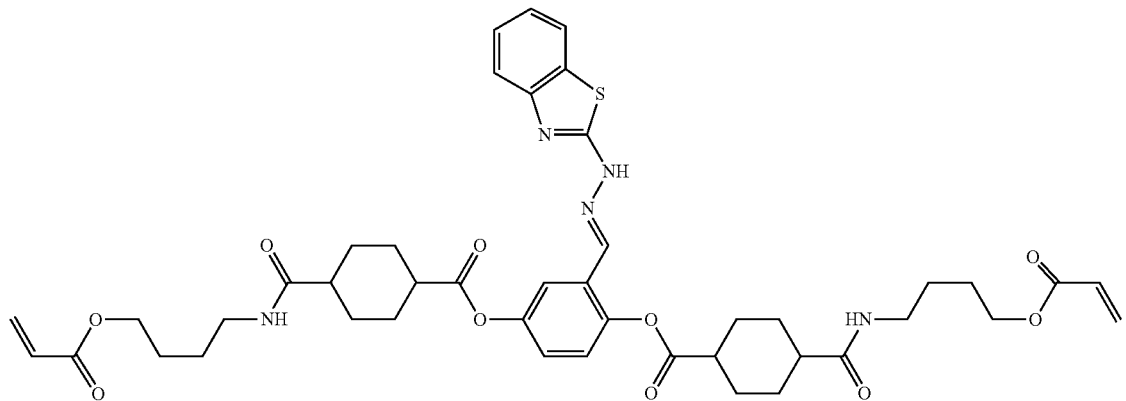
II-4-1
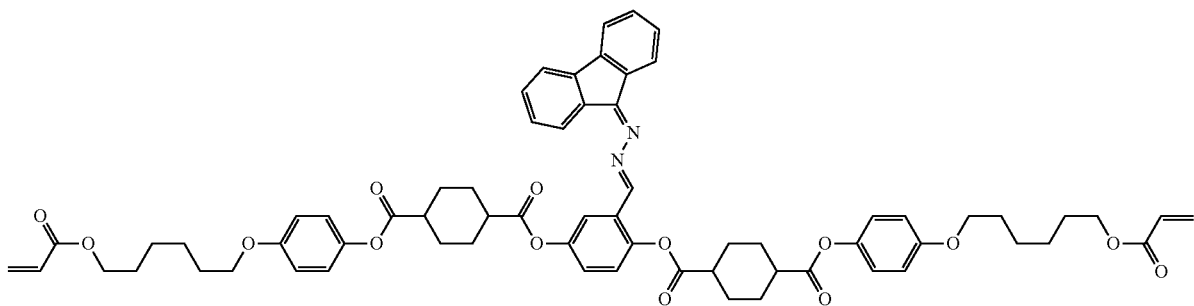

II-4-2

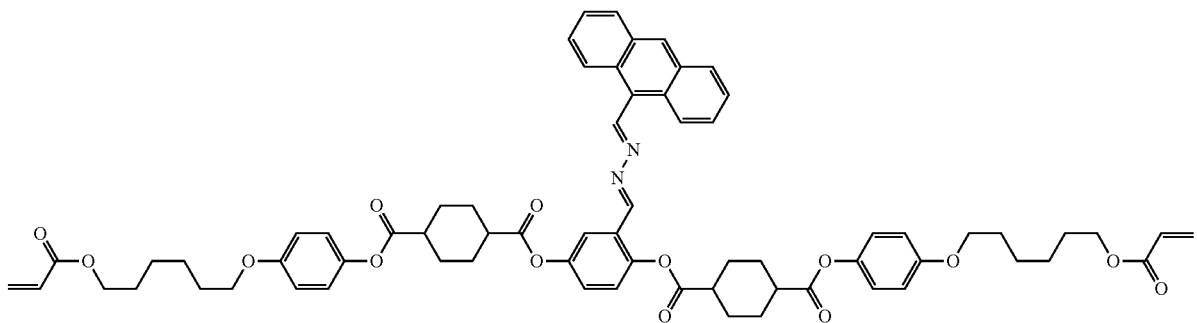

II-4-3

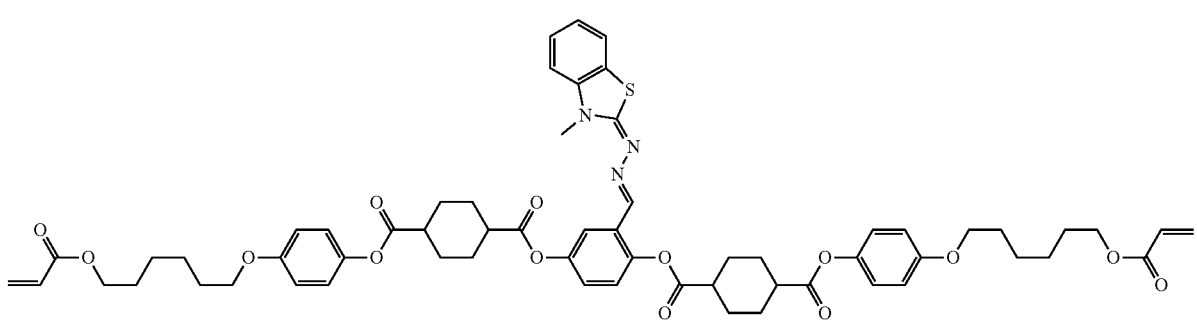

Further, in the present invention, as the liquid crystal compound represented by Formula (1), for the reason for further improving the durability of the optically anisotropic layer by electronic interaction between liquid crystal molecules, $Ar^1$ in Formula (1) is preferably a compound represented by Formula (II-2). Specifically, it is more preferable that n in Formula (1) is 2 and $Ar^1$ is a compound represented by Formula (1a).

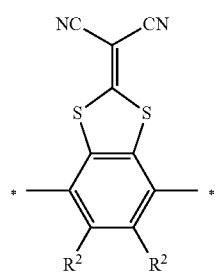

(1a)

Herein, in Formula (1a), * represents a bonding position, and $R^2$'s each independently represent a hydrogen atom or an alkyl group having 1 to 6 carbon atoms.

Examples of a compound in which n in Formula (1) is 2 and $Ar^1$ is a compound represented by Formula (1a) include a compound represented by Formula L-1 (liquid crystal compound L-1), a compound represented by Formula. L-2 (liquid crystal compound L-2), a compound represented by Formula L-5 (liquid crystal compound L-5), and a compound represented by Formula L-6 (liquid crystal compound L-6). A group adjacent to an acryloyl oxy group in Formulae L-1 and L-2 represents a propylene group (a group in which a methyl group is substituted with an ethylene group), and the liquid crystal compounds L-1 and L-2 represent mixtures of positional isomers in which the positions of methyl group are different. In addition, in Formulae L-1, L-2, L-5, and L-6, all 1,4-cyclohexylene groups are trans 1,4-cyclohexylene groups.

L-1

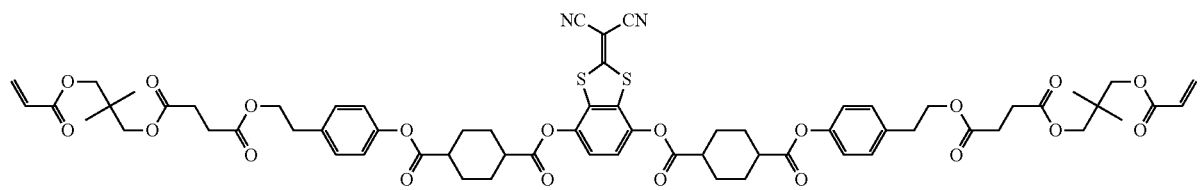

L-2

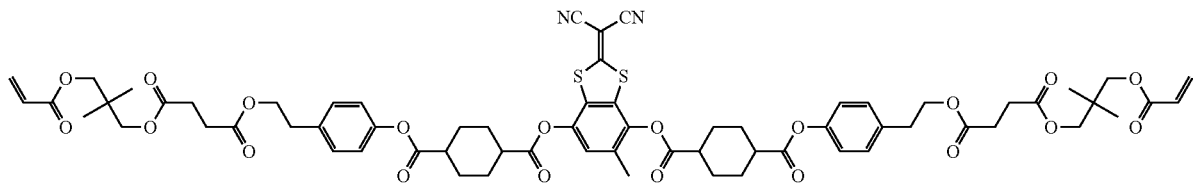

L-5

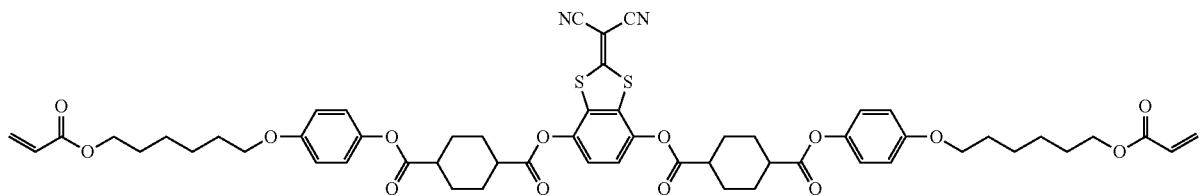

L-6

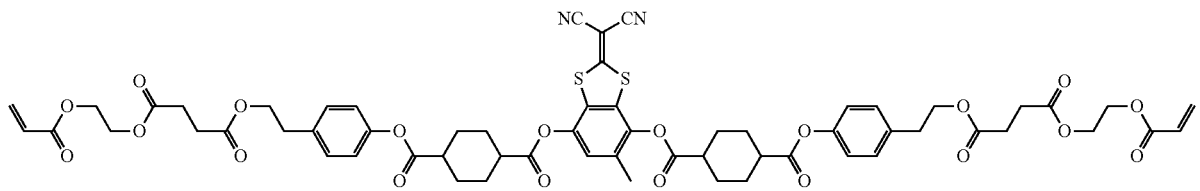

<Polymerization Initiator>

The polymerizable liquid crystal composition forming the optically anisotropic layer includes a polymerization initiator.

The polymerization initiator to be used is preferably a photopolymerization initiator that can initiate a polymerization reaction by irradiation with ultraviolet rays.

Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), multinuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acyl phosphine oxide compounds (described in JP1988-40799B (JP-S63-40799B), JP1993-29234B (JP-H05-29234B), JP1998-95788A (JP-H10-95788A), and JP1998-29997A (JP-H10-29997A)).

In the present invention, for the reason for further improving the durability of the optically anisotropic layer, the polymerization initiator is preferably an oxime type polymerization initiator, and specifically; the polymerization initiator is more preferably an oxime type polymerization initiator represented by Formula (2),

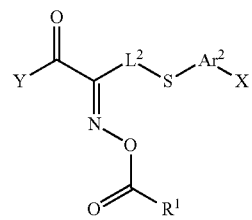

(2)

Herein, in Formula (2), X represents a hydrogen atom or a halogen atom, and $Ar^2$ represents a divalent aromatic group, $L^2$ represents a divalent organic group having 1 to 12 carbon atoms, $R^1$ represents an alkyl group having 1 to 12 carbon atoms, and Y represents a monovalent organic group.

In Formula (2), examples of the halogen atom represented by X include a fluorine atom, a chlorine atom, a bromine atom, and an iodine atom, and among them, a chlorine atom is preferable.

In addition, as the divalent aromatic group represented by $Ar^2$ in Formula (2), a divalent group having at least one aromatic ring selected from the group consisting of the aromatic hydrocarbon ring and the aromatic heterocyclic ring exemplified as $Ar^3$ in Formula (1) may be used.

In addition, examples of the divalent organic group in Formula (2), having 1 to 12 carbon atoms represented by $L^2$ include a linear or branched alkylene group having 1 to 12 carbon atoms. Specifically, a methylene group, an ethylene group, a propylene group, and the like may be suitably used.

In addition, in Formula (2), specifically suitable examples of the alkyl group having 1 to 12 carbon atoms represented by $R^1$ includes a methyl group, an ethyl group, and a propyl group, Further, in Formula (2), examples of the monovalent organic group represented by Y include functional groups including a benzophenone skeleton $((C_6H_5)_2CO)$. Specifically, like the groups represented by Formulae (2a) and (2b), functional groups including a benzophenone skeleton in which a benzene ring at the terminal is unsubstituted or has one substituent are preferable.

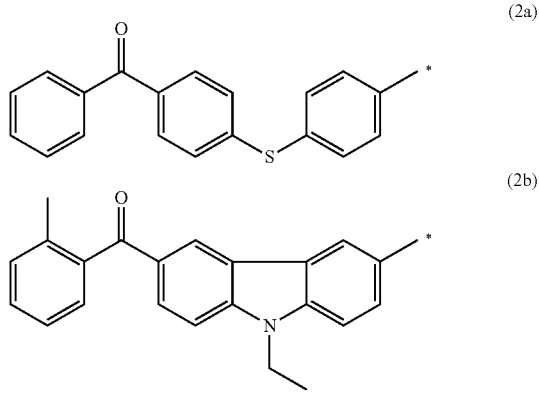

(2a)

(2b)

Herein, in Formulae (2a) and (2b), * represents a bonding position, that is, a bonding position with the carbon atom of the carbonyl group in Formula (2).

Examples of the oxime type polymerization initiator represented by Formula (2) include a compound represented by Formula S-1 and a compound represented by Formula S-2.

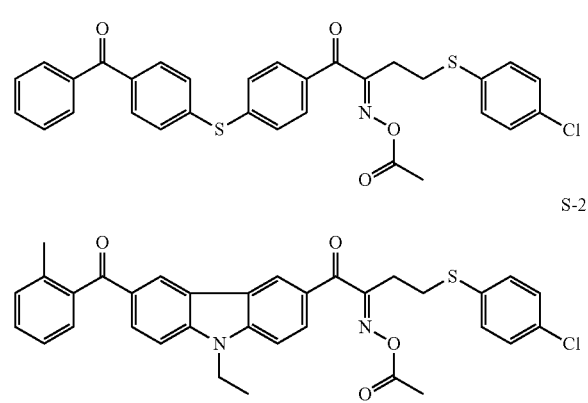

S-1

S-2

In the present invention, the content of the polymerization initiator is not particularly limited. However, the solid content of the polymerizable liquid crystal composition is preferably 0.01% to 20% by mass and more preferably 0.5% to 5% by mass.

<Polymerizable Compound>

The polymerizable liquid crystal composition forming the optically anisotropic layer may include polymerizable compounds other than the liquid crystal compounds represented by Formula (1).

Herein, the polymerizable group of the polymerizable compound is not particularly limited and examples thereof include a (meth)acryloyl group, a vinyl group, a styryl group, and an allyl group. Among these, the polymerizable compound preferably has a (meth)acryloyl group.

In the present invention, for the reason for further improving the durability of the optically anisotropic layer, the polymerizable compound is preferably a compound having a mesogen group.

Generally, a liquid crystal molecule is constituted of a rigid partial structure and one or more flexible partial structures. The rigid partial structure is contributive to align the molecule, whereas the flexible partial structure is contributive to impart fluidity to liquid crystal. The rigid partial structure indispensable for liquid crystal is called "mesogen".

The mesogen group of the polymerizable compound is not particularly limited and various structures may be adopted. Preferable is a mesogen group represented by Formula (MG-I).

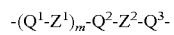 MG-I:

In the formula, $Q^1$, $Q^2$, and $Q^3$ independently represent a 1,4-phenylene group (hereinafter, also referred to as "benzene ring"), a heterocyclic group obtained by substituting one or two CH groups of a 1,4-phenylene group with N, a 1,4-cyclohexylene group (hereinafter, also referred to as "cyclohexane ring"), a heterocyclic group obtained by possibly substituting one $CH_2$ group or two non-adjacent $CH_2$ groups of a 1,4-cyclohexylene group with O and/or S, a 1,4-cyclohexenylene group, or a naphthalene-2,6-diyl group. These groups may have a substituent.

$Z^1$ and $Z^2$ each independently represent —COO—, —OCO—, —CH$_2$CH$_2$—, —OCH$_2$—, —CH$_2$O—, —CH═CH—, —C≡C—, —CH═CH—COO—, —OCO—CH═CH—, or a single bond, and m represents 0, 1 or 2.

A bicyclic or tricyclic mesogen group is preferable and a compound in which $Z^1$ and $Z^2$ each represent —COO—, —OCO—, —CH$_2$—CH$_2$—, —CH═CH—COO—, —OCO—CH═CH—, or a single bond is particularly preferable.

For the reason for further improving the durability of the optically anisotropic layer, the compound having the mesogen group is preferably a compound having at least one ring structure selected from the group consisting of a benzene ring and a cyclohexane ring.

In Formula (MG-1), as described in $Q^1$, $Q^2$, and $Q^3$ above, both the benzene ring and the cyclohexane ring may have a substituent.

In addition, for the reason for further improving the durability of the optically anisotropic layer, regarding the compound having the mesogen group, the number of cyclohexane rings in the compound having the mesogen group is preferably 2 or less, more preferably 1 or less, and still more preferably 0.

In the present invention, the ring structure of the compound having the mesogen group preferably has a substituent from the viewpoint of workability for forming the optically anisotropic layer or the like. However, in a case of the compound having a substituent, the compound preferably has a substituent having a van der Waals volume of 0.30 [$10^2$ Å$^3$] or less.

Herein, the van der Waals volume refers to a volume of a region occupied by a van der Waals sphere on based on a van der Waals radius of the atom constituting the substituent and is a value calculated using the values and methods described in pages 134 to 136 of "Kagaku no Ryoiki, extra publication vol. 122: Structural Activity Relationship of Drugs (Guide to Drug Design and Action Mechanism), published by Nankodo Co., Ltd., 1979".

Examples of such a polymerizable compound include compounds represented by Formulae (M1), (M2), and (M3) described in paragraphs [0030] to [0033] of JP2014-077068A and more specific examples thereof include specific examples described in paragraphs [0046] to [0055] of JP2014-077068A.

in the present invention, in a ease in which the polymerizable liquid crystal composition contains the polymerizable compound is not particularly limited and with respect to total 100 parts by mass of the above-described liquid crystal compound and polymerizable compound, the content of the polymerizable compound is preferably 1 to 40 parts by mass and is more preferably 5 to 30 parts by mass.

<Solvent>

The polymerizable liquid crystal composition forming the optically anisotropic layer preferably contains a solvent from the viewpoint of workability for forming the optically anisotropic layer and the like.

Specific examples of the solvent include ketones (such as acetone, 2-butanone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene, xylene, and trimethylbenzene), halogenated carbons (such as dichloromethane, dichloroethane, dichlorobenzene, and chlorotoluene), esters (such as methyl acetate, ethyl acetate, and butyl acetate), water, alcohols (such as ethanol, isopropanol, butanol, and cyclohexanol), cellosolves (such as methyl cellosolve and ethyl cellosolve), cellosolve acetates, sulfoxides (such as dimethyl sulfoxide), and amides (such as dimethylformamide and dimethylacetamide). These may be used alone or may be used in combination of two or more kinds.

In the present invention, as the method of forming the optically anisotropic layer, for example, a method in which a desired alignment state is obtained using the polymerizable liquid crystal composition containing an arbitrary polymerizable compound and an organic solvent in addition to the above-described liquid crystal compound and polymerization initiator and then the alignment state is fixed by polymerization, and the like may be used.

Herein, the polymerization conditions are not particularly limited and in the polymerization by photoirradiation, ultraviolet (UV) rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$. In addition, in order to promote the polymerization reaction, the polymerization may be carried out under a heating condition.

In the present invention, the optically anisotropic layer can be formed on an arbitrary support described later or a polarizer of a polarizing plate of the present invention described later.

In addition, in the present invention, for the reason for improving the contrast of an image display device, the optically anisotropic layer is preferably a layer that can be obtained by aligning the above-described polymerizable liquid crystal composition in a smectic phase and then polymerizing (fixing the alignment) the compound. It is considered that this is because the degree of order of the smectic phase is higher than that of a nematic phase and scattering caused by the alignment disorder of the optically anisotropic layer is suppressed.

The density of the optically anisotropic layer of the optical film of the present invention is 1.20 g/cm$^3$ or more as described above. However, for the reason for further improving the durability of the optically anisotropic layer, the density is preferably 1.25 g/cm$^3$ or more and density is more preferably 1.25 to 1.30 g/cm$^3$.

In addition, the crosslinking point density of the optically anisotropic layer of the optical film of the present invention is 0.0016 mol/cm$^3$ or more as described above. However, for the reason for further improving the durability of the optically anisotropic layer, the crosslinking point density is more preferably 0.0016 to 0.0030 mol/cm$^3$ and the crosslinking point density is still more preferably 0.0020 to 0.0030 mol/cm$^3$.

Herein, the method for adjusting the density and the crosslinking point density of the optically anisotropic layer is not particularly limited. For example, by appropriately selecting the kind of polymerizable group of the above-described liquid crystal compound and an arbitrary polymerizable compound (hereinafter, these are abbreviated as "monomer" in the paragraph), the kind of substituent of the monomer and the constitutional ratio thereof, the molecular weight after polymerization of the monomer, and the like, the density and the crosslinking point density can be controlled to be in desired ranges.

Further, as another method for adjusting the density and the crosslinking point density, a method using the above-described oxime type polymerization initiator, a method of setting the temperature (polymerization temperature) of a film (a coating film of the polymerizable composition) at ultraviolet irradiation to, for example, 55° C. to 65° C., and the like may be used.

In addition, the optically anisotropic layer of the optical film of the present invention preferably satisfies Expression (I) from the viewpoint of imparting excellent viewing angle properties.

$$0.75 \leq Re(450)/Re(550) \leq 1.00 \tag{I}$$

Herein, in Expression (I), Re(450) represents an in-plane retardation of the optically anisotropic layer at a wavelength of 450 nm, and Re(550) represents an in-plane retardation of the optically anisotropic layer at a wavelength of 550 nm.

In addition, the in-plane retardation value refers a value measured with light at the measurement wavelength using an automatic birefringence meter (KOBRA-21ADH, manufactured by Oji Scientific Instruments).

In the present invention, although the thickness of the optically anisotropic layer is not particularly limited, the thickness thereof is preferably 0.1 to 10 μm and more preferably 0.5 to 5 μm.

[Support]

The optical film of the present invention may have a support as a substrate for forming the optically anisotropic layer as described above.

Such a support is preferably transparent and specifically, the support preferably has a light transmittance of 80% or more.

Examples of such a support include glass substrates and polymer films. Examples of the material for the polymer film include cellulose-based polymers; acrylic polymers having acrylic ester polymers such as polymethyl methacrylate, and lactone ring-containing polymers; thermoplastic norbornene-based polymers; polycarbonate-based polymers; polyester-based polymers such as polyethylene terephthalate and polyethylene naphthalate; styrene-based polymers such as polystyrene and acrylonitrile-styrene copolymers (AS resin); polyolefin-based polymers such as polyethylene, polypropylene, and ethylene-propylene copolymers; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers containing a mixture of these polymers.

In addition, the polarizer which will be described later may function as such a support.

In the present invention, although the thickness of the support is not particularly limited, the thickness thereof is preferably 5 to 60 µm and more preferably 5 to 30 µm.

[Alignment Film]

In the case in which the optical film has the above-described arbitrary support, the optical film of the present invention preferably has an alignment film between the support and the optically anisotropic layer. The above-described support may function as an alignment film.

The alignment film generally has a polymer as a main component. The materials for the polymer material for an alignment film are described in many documents and many commercially available products can be used.

The polymer material used in the present invention is preferably a polyvinyl alcohol, or a polyimide, or a derivative thereof. Particularly, a modified or non-modified polyvinyl alcohol is preferable.

Examples of alignment films that can be used in the present invention include alignment films described in Line 24 on Page 43 to Line 8 on Page 49 of WO01/88574A; modified polyvinyl alcohols described in paragraphs [0071] to [0095] of JP3907735B; and a liquid crystal alignment film formed by a liquid crystal aligning agent described in JP2012-155308A.

In the present invention, for the reason that surface state deterioration can be prevented by avoiding a contact with the surface of the alignment film at the time of forming the alignment film, an optical alignment film is preferably used as the alignment film.

Although the optical alignment film is not particularly limited, polymer materials such as polyimide compounds and polyimide compounds described in paragraphs [0024] to [0043] of WO2005/096041A; a liquid crystal alignment film formed by a liquid crystal aligning agent having a photo-aligned group described in JP2012-155308A; and LPP-JP265CP, product name, manufactured by Rolic technologies Ltd. can be used.

In addition, in the present invention, although the thickness of the alignment film is not particularly limited, from the viewpoint of forming an optically anisotropic layer having a uniform film thickness by alleviating the surface roughness present on the support, the thickness thereof is preferably 0.01 to 10 µm, more preferably 0.01 to 1 µm, and still more preferably 0.01 to 0.5 µm.

[Hard Coat Layer]

The optical film of the present invention preferably has a hard coat layer for imparting film physical strength. Specifically, the hard coat layer may be provided on the side of the support opposite to the side on which the alignment film is provided (refer to FIG. 1B) or may be provided on the side of the optically anisotropic layer opposite to the side on which the alignment film is provided (refer to FIG. 1C).

As the hard coat layer, layers described in paragraphs [0190] to [0196] of JP2009-98658A can be used.

[Other Optically Anisotropic Layers]

The optical film of the present invention may have optically anisotropic layers other than the layer obtained by polymerizing the above-described polymerizable liquid crystal composition containing the liquid crystal compound represented by Formula (1) and the polymerization initiator (hereinafter, formally referred to as "optically anisotropic layer of the present invention" in the paragraph). That is, the optical film of the present invention may have a laminated structure of the optically anisotropic layer of the present invention and other optically anisotropic layers.

Such other optically anisotropic layers are not particularly limited as long as the optically anisotropic layers include liquid crystal compounds other than the above-described liquid crystal compound represented by Formula (1).

Here, generally, liquid crystal compounds are classified into a rod-like type and a disk-like type according to the shape thereof. Further, each includes a low molecular type and a high molecular type. The term "high molecular" generally refers to a compound having a degree of polymerization of 100 or more (Polymer Physics-Phase Transition Dynamics, by Masao Doi, p. 2, published by Iwanami Shoten, Publishers, 1992). In the present invention, any type of liquid crystal compound can be used, but a rod-like liquid crystal compound or a discotic liquid crystal compound (disk-like liquid crystal compound) is preferably used. Two or more kinds of rod-like liquid crystal compounds, two or more kinds of disk-like liquid crystal compounds, or a mixture of a rod-like liquid crystal compound and a disk-like liquid crystal compound may be used. In order to fix the above-described liquid crystal compound, the optically anisotropic layer is more preferably formed using a rod-like liquid crystal compound or disk-like liquid crystal compound having a polymerizable group, and the liquid crystal compound still more preferably has two or more polymerizable groups in one molecule. In the case of a mixture of two or more kinds of the liquid crystal compounds, at least one kind of liquid crystal compound preferably has two or more polymerizable groups in one molecule.

As the rod-like liquid crystal compound, for example, the rod-like liquid crystal compounds described in claim 1 of JP1999-513019A (JP-H11-513019A) or paragraphs [0026] to [0098] of JP2005-289980A can be preferably used, and, as the discotic liquid crystal compounds, for example, the discotic liquid crystal compounds described in paragraphs [0020] to [0067] of JP2007-108732A and paragraphs [0013] to [0108] of JP2010-244038A can be preferably used, but the liquid crystal compounds are not limited thereto.

[Ultraviolet Absorbent]

The optical film of the present invention preferably includes an ultraviolet (UV) absorbent in consideration of effect of external light (particularly, ultraviolet rays) and more preferably includes an ultraviolet absorbent in the support.

As the ultraviolet absorbent, any of known ultraviolet absorbents can be used since ultraviolet absorbency can be exhibited. Among these ultraviolet absorbents, in order to obtain a high ultraviolet absorbency and ultraviolet absorptivity (ultraviolet cutting ability) used for an electronic image display device, a benzotriazole-based or hydroxyphenyl triazine-based ultraviolet absorbent is preferable. In addition, in order to widen the ultraviolet absorption width, two or more kinds of ultraviolet absorbents having different maximum absorption wavelengths can be used in combination.

[Polarizing Plate]

A polarizing plate of the present invention has the above-described optical film of the present invention and a polarizer.

[Polarizer]

The polarizer of the polarizing plate of the present invention is not particularly limited as long as the polarizer is a member having a function of converting light into specific linearly polarized light, and conventionally known absorptive type polarizer and reflective type polarizer can be used, An iodine-based polarizer, a dye-based polarizer using a dichroic dye, a polyene-based polarizer, and the like are used as the absorptive type polarizer. The iodine-based polarizer and the dye-based polarizer are a coating type polarizer and a stretching type polarizer, any one of these polarizers can be applied. However, a polarizer which is prepared by allowing polyvinyl alcohol to adsorb iodine or a dichroic dye and performing stretching is preferable.

In addition, examples of a method of obtaining a polarizer by performing stretching and dyeing in a state of a laminated film in which a polyvinyl alcohol layer is formed on a substrate include methods disclosed in JP5048120B, JP5143918B, JP4691205B, JP4751481B, and JP4751486B, and known technologies related to these polarizers can be preferably used.

A polarizer in which thin films having different birefringence are laminated, a wire grid type polarizer, a polarizer in which a cholesteric liquid crystal having a selective reflection range and a ¼ wavelength plate are combined, and the like are used as the reflective type polarizer.

Among these, a polarizer containing a polyvinyl alcohol-based resin (a polymer including —$CH_2$—CHOH— as a repeating unit, in particular, at least one selected from the group consisting of polyvinyl alcohol and an ethylene-vinyl alcohol copolymer) is preferable from the viewpoint of more excellent adhesiveness with respect to the resin layer which will be described below.

In the present invention, although the thickness of the polarizer is not particularly limited, the thickness thereof is preferably 3 µm to 60 µm, more preferably 5 µm to 30 µm, and still more preferably 5 µm to 15 µm.

[Pressure Sensitive Adhesive Layer]

The polarizing plate of the present invention may have a pressure sensitive adhesive layer arranged between the optically anisotropic layer in the optical film of the present invention and the polarizer.

The pressure sensitive adhesive layer used for lamination of the optically anisotropic layer and the polarizer is, for example, a substance in which a ratio between storage elastic modulus G' and loss elastic modulus G" (tan δ=G"/G') is 0.001 to 1.5, where G' and G" are measured with a dynamic viscoelastometer. Such a substance includes a so-called pressure sensitive adhesive or readily creepable substance. As the pressure sensitive adhesive that can be used in the present invention, for example, a polyvinyl alcohol-based pressure sensitive adhesive may be used, but there is no limitation thereto.

[Image Display Device]

An image display device of the present invention is an image display device having the optical film of the present invention or the polarizing plate of the present invention.

The display element used for the image display device of the present invention is not particularly limited and examples thereof include a liquid crystal cell, an organic electroluminescent (hereinafter, abbreviated as "EL") display panel, and a plasma display panel.

Among these, a liquid crystal cell and an organic EL display panel are preferable, and a liquid crystal cell is more preferable. That is, for the image display device of the present invention, a liquid crystal display device using a liquid crystal cell as a display element, and an organic EL display device using an organic EL display panel as a display element are preferable and a liquid crystal display device is more preferable,

[Liquid Crystal Display Device]

A liquid crystal display device as an example of the image display device of the present invention is a liquid crystal display device including the above-described polarizing plate of the present invention and a liquid crystal cell.

In the present invention, it is preferable that the polarizing plate of the present invention is used for the polarizing plate of the front side, out of the polarizing plates provided on the both sides of the liquid crystal cell, and it is more preferable that the polarizing plate of the present invention is used for the polarizing plates on the front and rear sides.

Hereinafter, the liquid crystal cell constituting the liquid crystal display device will be described in detail.

<Liquid Crystal Cell>

The liquid crystal cell for use in the liquid crystal display device is preferably of a vertical alignment (VA) mode, an optically compensated bend (OCB) mode, an in-plane-switching (IPS) mode or a twisted nematic (TN) mode but the cell mode is not limited thereto, In a TN mode liquid crystal cell, rod-like liquid crystal molecules are aligned substantially horizontally in a case in which no voltage is applied and are further aligned in a twisted manner in a range of 60° to 120°. The TN mode liquid crystal cell is most often used in a color TFT liquid crystal display device and is mentioned in many literatures.

In a VA mode liquid crystal cell, rod-like liquid crystal molecules are aligned substantially vertically in a case in which no voltage is applied. Examples of the VA mode liquid crystal cells include (1) a narrowly defined VA mode liquid crystal cell (described in JP1990-176625A (JP-H02-176625A)) in which rod-like liquid crystal molecules are aligned substantially vertically in a ease in which no voltage is applied and are aligned substantially horizontally in a case in which a voltage is applied, (2) a multi-domain VA mode (MVA mode) liquid crystal cell for enlarging the viewing angle (SID97, Digest of Tech. Papers (Proceedings) 28 (1997) 845), (3) a liquid crystal cell in a mode (n-ASM mode) in which rod-like liquid crystal molecules are aligned substantially vertically in a case in which no voltage is applied and are aligned in twisted multi-domain alignment in a case in which a voltage is applied (Proceedings of Japanese Liquid Crystal Conference, 58 and 59 (1998)), and (4) a SURVIVAL mode liquid crystal cell (presented in LCD International 98). The liquid crystal cell may be of any of a patterned vertical alignment (PVA) type, an optical alignment type, and a polymer-sustained alignment (PSA) type. These modes are described in detail in JP2006-215326A and JP2008-538819A.

In an IPS mode liquid crystal cell, rod-like liquid crystal molecules are aligned substantially parallel with respect to a substrate and application of an electric field parallel to the substrate surface causes the liquid crystal molecules to respond planarly. The IPS mode displays black in a case in which no electric field is applied and a pair of upper and lower polarizing plates have absorption axes which are orthogonal to each other. A method of improving the viewing angle by reducing light leakage during black display in an oblique direction using an optical compensation sheet is described in JP1998-54982A (JP-H10-54982A), JP1999-

202323A (JP-H11-202323A), JP1997-292522A (JP-H09-292522A), 1999-133408A (JP-H11-133408A), JP1999-305217A (JP-H11-305217A), JP1998-307291A (JP-H1110-307291A), and the like.

[Organic EL Display Device]

As the organic EL display device which is an example of the image display device of the present invention, for example, an embodiment which includes, from the visible side, the polarizing plate of the present invention, a plate having a λ/4 function (hereinafter referred to also as "λ/4 plate") and an organic EL display panel in this order is suitable.

The "plate having a λ/4 function" as used herein refers to a plate having a function of converting linearly polarized light at a specific wavelength into circularly polarized light (or circularly polarized light into linearly polarized light). Specific examples of an embodiment in which the λ/4 plate is of a single layer structure include a stretched polymer film, and a phase difference film in which an optically anisotropic layer having a λ/4 function is provided on a support. A specific example of an embodiment in which the λ4 plate is of a multilayer structure includes a broadband λ/4 plate in which the λ4 plate and a λ/2 plate are laminated on each other.

The organic EL display panel is a display panel configured using an organic EL device in which an organic light emitting layer (organic electroluminescent layer) is sandwiched between electrodes (between a cathode and an anode). The configuration of the organic EL display panel is not particularly limited but any known configuration is adopted.

EXAMPLES

The present invention will be described below in further detail based on examples. The materials, amounts used, ratios, treatments and treatment procedures shown in the examples below can be modified as appropriate in the range of not departing from the spirit of the present invention. Therefore, the scope of the present invention should not be construed as being limited to the following examples.

Example 1

<Formation of Optical Alignment Film P-1>

A coating solution 1 for photo alignment prepared with reference to the description of Example 3 of JP2012-155308A was applied to one surface of a polarizer 1 having a film thickness of 20 μm prepared by causing iodine to adsorb to a stretched polyvinyl alcohol film according to Example 1 of JP2001-141926A using a secondary bar.

After application, the solvent was removed by drying to form a photoisomerizable composition layer 1.

The obtained photoisomerizable composition layer 1 was irradiated with polarized ultraviolet rays (at 180 mJ/cm$^2$ using an ultra-high pressure mercury lamp) to form an optical alignment film P-1.

<Formation of Optically Anisotropic Layer 1>

The coating solution 1 for an optically anisotropic layer having the following composition was applied to the optical alignment film P-1 by a spin coating method to form a liquid crystal composition layer 1.

The formed liquid crystal composition layer 1 was once heated on a hot plate to 90° C. and then cooled to 60° C. so that the alignment was stabilized in a smectic A phase (SmA phase).

Then, while keeping the temperature at 60° C., the alignment was fixed by the ultraviolet irradiation (at 500 mJ/cm$^2$ using an ultra-high pressure mercury lamp) in a nitrogen atmosphere (at an oxygen concentration of 100 ppm) to form an optically anisotropic layer 1 having a thickness of 2.0 μm was formed. Thus, an optical film was prepared.

| Coating Solution 1 for Optically Anisotropic Layer | |
|---|---|
| Liquid crystal compound L-1 shown below | 43.75 parts by mass |
| Liquid crystal compound L-2 shown below | 43.75 parts by mass |
| Polymerizable compound A-1 shown below | 12.50 parts by mass |
| Polymerization initiator S-1 (oxime type) shown below | 3.00 parts by mass |
| Leveling agent (Compound T-1 shown below) | 0.20 parts by mass |
| Methyl ethyl ketone | 219.30 parts by mass |

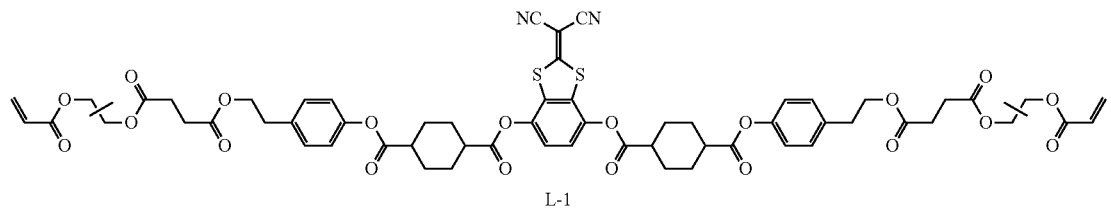

L-1

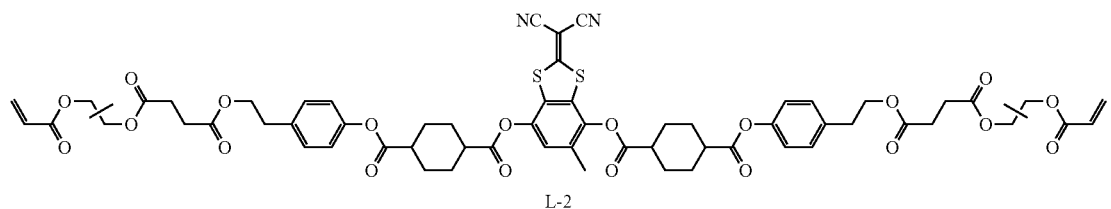

L-2

Coating Solution 1 for Optically Anisotropic Layer

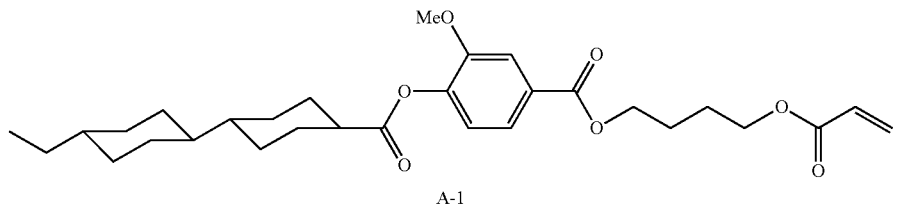

A-1

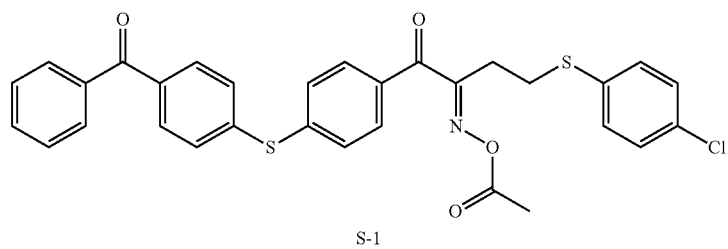

S-1

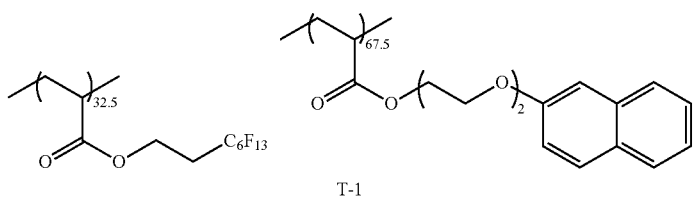

T-1

Example 2

An optically anisotropic layer 2 of Example 2 was formed in the same manner as in Example 1 except that a coating solution 2 for an optically anisotropic layer having the following composition was used instead of using the coating solution 1 for an optically anisotropic layer in Example 1.

| Coating Solution 2 for Optically Anisotropic Layer | |
|---|---|
| Liquid crystal compound L-1 shown above | 50 parts by mass |
| Liquid crystal compound L-2 shown above | 50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

Example 3

An optically anisotropic layer 3 of Example 3 was formed in the same manner as in Example 1 except that a coating solution 3 for an optically anisotropic layer having the following composition was used instead of using the coating solution 1 for an optically anisotropic layer in Example 1.

| Coating Solution 3 for Optically Anisotropic Layer | |
|---|---|
| Liquid crystal compound L-1 shown above | 43.75 parts by mass |
| Liquid crystal compound L-2 shown above | 43.75 parts by mass |
| Polymerizable compound A-2 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

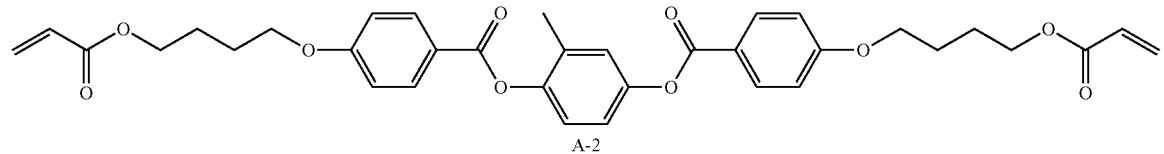

A-2

Example 4

A liquid crystal composition layer was formed by applying the coating solution 3 for an optically anisotropic layer prepared in Example 3 by a spin coating method and then was heated to 90° C. on a hot plate. Then, while keeping the temperature at 90° C., the alignment was fixed by ultraviolet irradiation (at 5,000 mJ/cm² using an ultra-high pressure mercury lamp) in a nitrogen atmosphere (at an oxygen concentration of 100 ppm) to form an optically anisotropic layer 4 having a thickness of 2.0 μm. Thus, an optical film was prepared.

Example 5

An optically anisotropic layer 5 of Example 5 was formed in the same manner as in Example 1 except that a coating solution 5 for an optically anisotropic layer having the following composition was used instead of the coating solution 1 for an optically anisotropic layer in Example 1.

| Coating Solution 5 for Optically Anisotropic Layer | |
|---|---|
| Liquid crystal compound L-1 shown above | 27.50 parts by mass |
| Liquid crystal compound L-2 shown above | 27.50 parts by mass |
| Polymerizable compound A-2 shown above | 45.00 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

Example 6

An optically anisotropic layer 6 of Example 6 was formed in the same manner as in Example 1 except that a coating solution 6 for an optically anisotropic layer having the following composition was used instead of the coating solution 1 for an optically anisotropic layer in Example 1.

| Coating Solution 6 for Optically Anisotropic Layer | |
|---|---|
| Liquid crystal compound L-1 shown above | 43.75 parts by mass |
| Liquid crystal compound L-2 shown above | 43.75 parts by mass |
| Polymerizable compound A-2 shown above | 12.50 parts by mass |
| Polymerizable compound B-1 shown below | 10.00 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

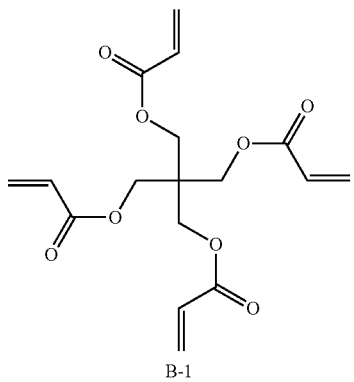

B-1

Example 7

An optically anisotropic layer 7 of Example 7 was formed in the same manner as in Example 1 except that a coating solution 7 for an optically anisotropic layer having the following composition was used instead of the coating solution 1 for an optically anisotropic layer in Example 1.

| Coating Solution 7 for Optically Anisotropic Layer | |
|---|---|
| Liquid crystal compound L-1 shown above | 43.75 parts by mass |
| Liquid crystal compound L-2 shown above | 43.75 parts by mass |
| Polymerizable compound A-3 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

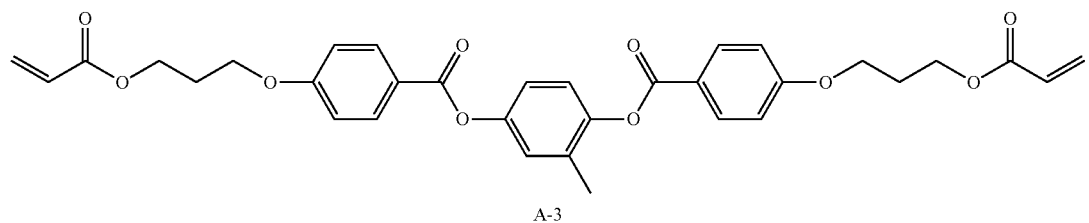

A-3

Example 8

An optically anisotropic layer 8 of Example 8 was formed in the same manner as in Example 1 except that a coating solution 8 for an optically anisotropic layer having the following composition was used instead of the coating solution 1 for an optically anisotropic layer in Example 1.

| Coating Solution 8 for Optically Anisotropic Layer | |
|---|---:|
| Liquid crystal compound L-1 shown above | 43.75 parts by mass |
| Liquid crystal compound L-2 shown above | 43.75 parts by mass |
| Polymerizable compound A-4 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

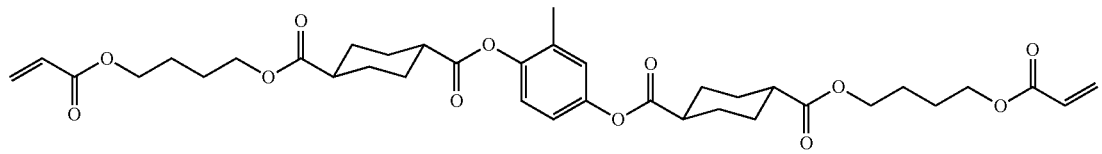

A-4

Example 9

An optically anisotropic layer 9 of Example 9 was formed in the same manner as in Example 1 except that a coating solution 9 for an optically anisotropic Layer having the following composition was used instead of the coating solution 1 for an optically anisotropic layer in Example 1.

| Coating Solution 9 for Optically Anisotropic Layer | |
|---|---:|
| Liquid crystal compound L-1 shown above | 43.75 parts by mass |
| Liquid crystal compound L-2 shown above | 43.75 parts by mass |
| Polymerizable compound A-1 shown above | 12.50 parts by mass |
| Polymerization initiator (IRGACURE 184, manufactured by BASF SE) | 3.00 parts by mass |
| Leveling agent (Compound T-1 shown above) | 0.20 parts by mass |
| Methyl ethyl ketone | 219.30 parts by mass |

Example 10

An optically anisotropic layer 10 of Example 10 was formed in the same manner as in Example 1 except that a coating solution 10 for an optically anisotropic layer having the following composition was used instead of the coating solution 1 for an optically anisotropic layer in Example 1.

| Coating Solution 10 for Optically Anisotropic Layer | |
|---|---:|
| Liquid crystal compound L-3 shown below | 87.50 parts by mass |
| Polymerizable compound A-2 shown above | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

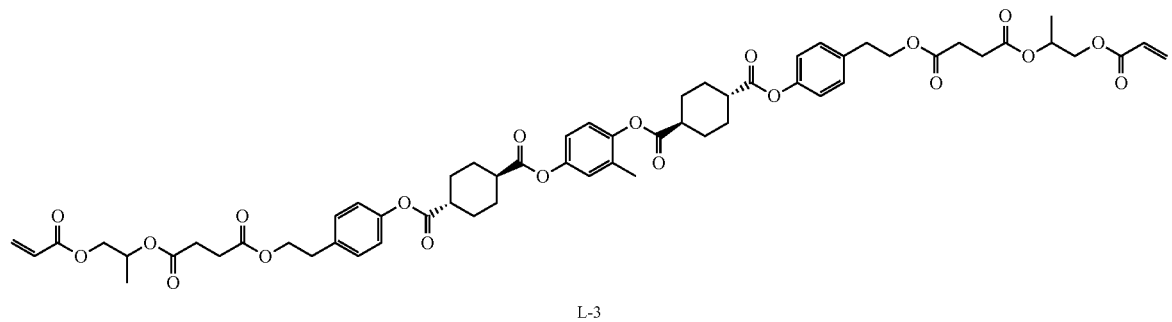 [SMILES: C=CC(=O)OCC(C)OC(=O)CCC(=O)OCCc1ccc(OC(=O)[C@H]2CC[C@H](C(=O)Oc3ccc(OC(=O)[C@H]4CC[C@H](C(=O)Oc5ccc(CCOC(=O)CCC(=O)OC(C)COC(=O)C=C)cc5)CC4)c(C)c3)CC2)cc1]

L-3

Example 11

An optically anisotropic layer 11 of Example 11 was formed in the same manner as in Example 1 except that a coating solution 11 for an optically anisotropic layer having the following composition was used instead of the coating solution 1 for an optically anisotropic layer in Example 1.

| Coating Solution 11 for Optically Anisotropic Layer | |
|---|---:|
| Liquid crystal compound L-4 shown below | 87.50 parts by mass |
| Polymerizable compound A-2 shown above | 12.50 parts by mass |

| Coating Solution 11 for Optically Anisotropic Layer | |
|---|---|
| Polymerizable compound B-1 shown above | 20.00 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

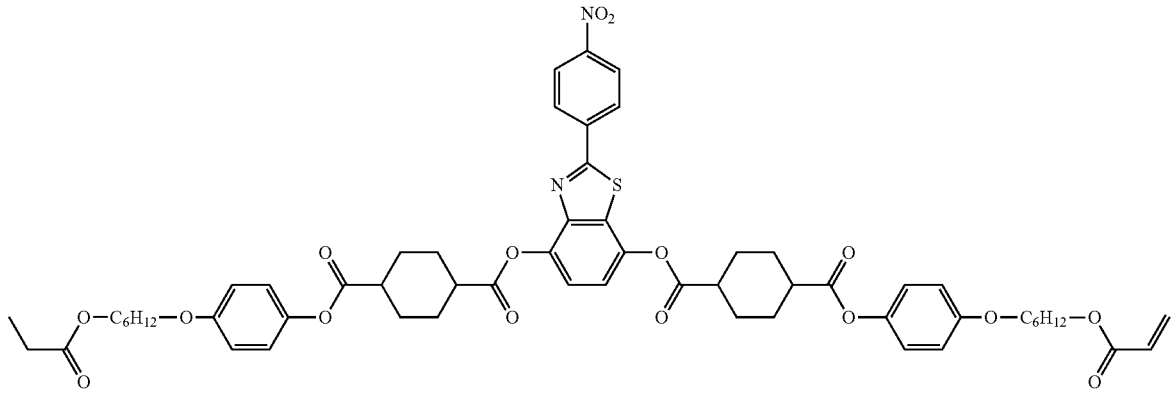

L-4

Example 12

An optically anisotropic layer 12 of Example 12 was formed in the same manner as in Example 1 except that a coating solution 12 for an optically anisotropic layer having the following composition was used instead of the coating solution 1 for an optically anisotropic layer in Example 1.

| Coating Solution 12 for Optically Anisotropic Layer | |
|---|---|
| Liquid crystal compound L-4 shown above | 55.00 parts by mass |
| Polymerizable compound A-2 shown above | 45.00 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

Comparative Example 1

An optically anisotropic layer C1 of Comparative Example 1 was formed in the same manner as in Example 1 except that the temperature at the time of ultraviolet irradiation for fixing the alignment in Example 1 was changed to 35° C.

Comparative Example 2

An optically anisotropic layer C2 of Comparative Example 2 was formed in the same manner as in Example 1 except that a coating solution C2 for an optically anisotropic layer having the following composition was used instead of the coating solution 1 for an optically anisotropic layer in Example 1.

| Coating Solution C2 for Optically Anisotropic Layer | |
|---|---|
| Liquid crystal compound L-1 shown above | 43.75 parts by mass |
| Liquid crystal compound L-2 shown above | 43.75 parts by mass |
| Polymerizable compound A-5 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

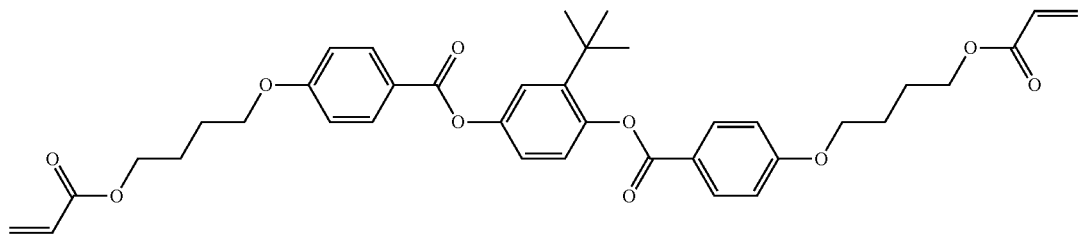

A-5

Comparative Example 3

An optically anisotropic layer C3 of Comparative Example 3 was formed in the same manner as in Example 1 except that a coating solution C3 for an optically anisotropic layer having the following composition was used instead of the coating solution 1 for an optically anisotropic layer in Example 1.

| Coating Solution C3 for Optically Anistropic Layer | |
|---|---:|
| Liquid crystal compound L-1 shown above | 43.75 parts by mass |
| Liquid crystal compound L-2 shown above | 43.75 parts by mass |
| Polymerizable compound A-6 shown below | 12.50 parts by mass |
| Polymerization initiator S-1 (oxime type) shown above | 3.00 parts by mass |
| Leveling agent (Compound T-1 shown above) | 0.20 parts by mass |
| Methyl ethyl ketone | 219.30 parts by mass |

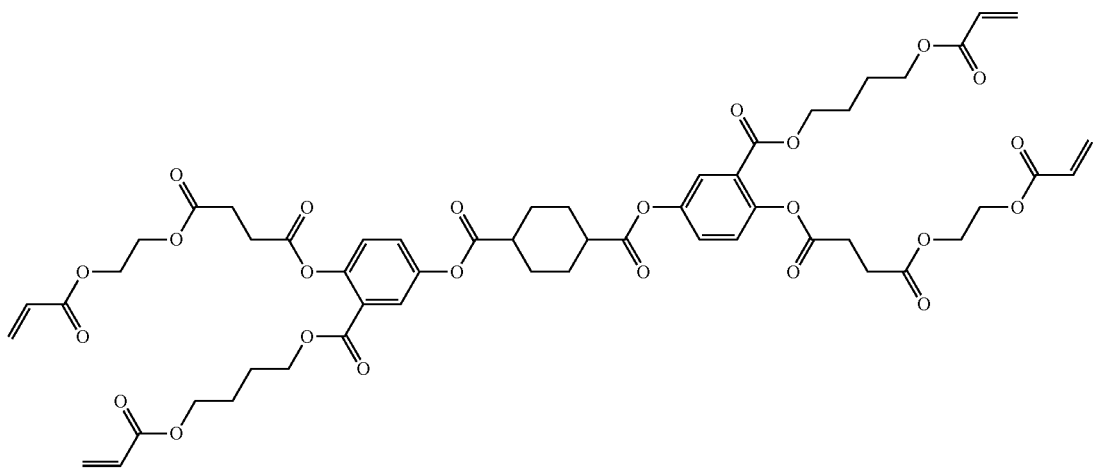

A-6

Comparative Example 4

<Formation of Optical Alignment Film P-2>

A coating solution for forming an optical alignment film P-2 having the following composition was applied to one surface of a polarizer 1 having a film thickness of 20 μm prepared by causing iodine to adsorb to a stretched polyvinyl alcohol film according to Example 1 of JP2001-141926A with a wire bar. The coating solution was dried with hot air at 60° C. for 60 seconds and further dried with hot air at 100° C. for 120 seconds to form an optical alignment film P-2.

| Composition of Coating Solution for Forming Optical Alignment Film P-2 | |
|---|---:|
| Material for photo alignment PA-1 | 1.0 part by mass |
| Butoxyethanol | 33 parts by mass |
| Propylene glycol monomethyl ether | 33 parts by mass |
| Water | 33 parts by mass |

<Formation of Optically Anisotropic Layer C4>

The prepared optical alignment film P-2 was vertically irradiated with ultraviolet rays in air with a 160 mW/cm² air-cooled metal halide lamp (manufactured by Eye Graphics Co., Ltd.). At this time, while setting a wire grid polarizer (ProFlux PPL02 manufactured by Moxtek Inc.) to be parallel with the surface of the optical alignment film P-2 and setting the transmission axis of the wire grid polarizer to be parallel with the absorption axis of the polarizer, exposure was performed. The illuminance of ultraviolet rays used at this time was set to 100 mW/cm² in a UV-A region (integrated value at a wavelength of 380 nm to 320 nm), and the irradiation dose was set to 1,000 mJ/cm² in the UV-A region. In this manner, a laminate in which the linear polarizer and the optical alignment film P-2 were in direct contact was prepared.

Subsequently, a coating solution for an optically anisotropic layer C4 having the following composition was applied to the optical alignment film P-2 using a bar coater. The coating solution was heated and aged at a film surface temperature of 90° C. for 30 seconds and then cooled to 60° C. Thereafter, the film was irradiated with ultraviolet rays at 1,000 mJ/cm² in air using a 70 mW/cm² air-cooled metal halide lamp (manufactured by Eye Graphics Co., Ltd.) to fix the alignment state. Thus, an optically anisotropic layer C4 was formed.

| Coating Solution C4 for Optically Anisotropic Layer | |
|---|---:|
| Liquid crystal compound L-5 shown below | 57.50 parts by mass |
| Liquid crystal compound L-6 shown below | 30.0 parts by mass |
| Polymerizable compound A-1 shown above | 12.50 parts by mass |
| Photopolymerization initiator (IRGACURE 819, manufactured by BASF SE) | 6.0 parts by mass |
| Leveling agent (Compound T-1 shown above) | 0.85 parts by mass |
| Chloroform | 600.00 parts by mass |

| Coating Solution C4 for Optically Anisotropic Layer |
|---|

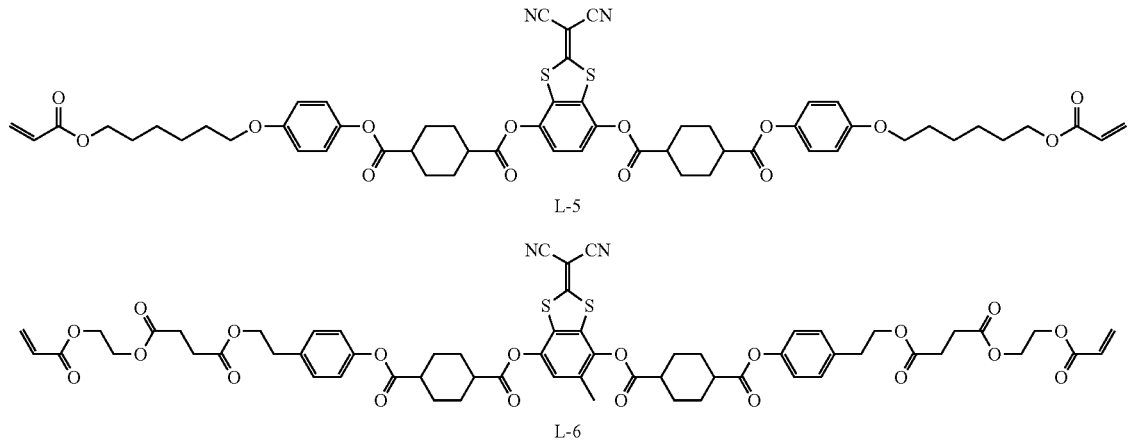

Comparative Example 5

A 2% by weight aqueous solution of polyvinyl alcohol (polyvinyl alcohol 1000 (fully saponified), manufactured by Wako Pure Chemical industries, Ltd.) was applied to a glass substrate and then heated and dried to obtain an alignment film P-3 having a thickness of 89 nm.

Subsequently, a surface of the obtained film was subjected to rubbing treatment and a coating solution C5 for an optically anisotropic layer having the following composition was applied to the rubbed surface by a spin coating method. The coating solution was dried on a hot plate at 80° C. for 1 minute and then further dried at 210° C. for 1 minute. The obtained unpolymerized film was cooled to 190° C. and was irradiated with ultraviolet rays at 1,200 mJ/cm$^2$ in air while keeping the same temperature. Thus, an optically anisotropic layer C5 having a film thickness of 2.4 μm was prepared.

| Coating Solution C5 for Optically Anisotropic Layer | |
|---|---|
| Liquid crystal compound L-4 shown above | 100 parts by mass |
| Photopolymerization initiator (IRGACURE 819, manufactured by BASF SE) | 10.0 parts by mass |
| Leveling agent BYK 361N (manufactured by BYK-Chemie GmbH) | 3.33 parts by mass |
| Chloroform | 220 parts by mass |

Each of the prepared optical films was immersed in hot water at 50° C. for 30 minutes or longer, the softened polarizer 1 was removed, and thus the optically anisotropic layer was isolated.

The in-plane retardation of each optically anisotropic layer at a wavelength of 450 nm and 550 nm was measured using an automatic birefringence meter (KOBRA-21ADH, manufactured by Oji Scientific Instruments) and Re(450)/Re(550) was calculated. The results are shown in Table 1.

In addition, the density and the crosslinking point density of each optically anisotropic layer were measured by the above-described method. The results are shown in Table 1.

<Durability>

The optical film prepared in each of Examples and Comparative Examples was attached to a glass plate with a pressure sensitive adhesive such that the optically anisotropic layer side became the glass side.

However, the optically anisotropic layer C5 prepared on the glass substrate in Comparative Example 5 was bonded with an iodine polarizer side surface of a polarizer 1 having a film thickness of 20 μm prepared by causing iodine to adsorb to a stretched polyvinyl alcohol film according to Example 1 of JP2001-141926A with a pressure sensitive adhesive, The durability of the retardation value was evaluated based on the following standards using Axo Scan (0PMF-1, manufactured by Axometrics Inc.). The results are shown in Table 1 below.

Regarding the test conditions, as shown in Table 1 below, a test in which the optical film was left to stand in an environment at 60° C. and a relative humidity of 90% for 1,000 hours and a test in which optical film was left to stand in an environment at 85° C. and a relative humidity of 85% for 240 hours were conducted. In addition, in the test in which the optical film is left to stand in an environment at 60° C. and a relative humidity of 90% for 1,000 hours, in a case in which the optical film is evaluated as "A", the durability can be determined to be satisfactory.

A: A change amount of the value after test with respect to the initial phase difference value is less than 2%.

B: A change amount of the value after test with respect to the initial phase difference value is 2% or more and less than 10%.

C: A change amount of the value after test with respect to the initial phase difference value is 10% or more and less than 50%.

D): A change amount of the value after test with respect to the initial phase difference value is 50% or more.

TABLE 1

| | | Polymerizable compound | | | | Polymerization conditions | | |
|---|---|---|---|---|---|---|---|---|
| | Liquid crystal compound | Kind | Amount of addition | Number of benzene rings | Number of cyclohexane rings | Van der Waals volume $10^2 Å^3$ | Polymerization initiator | Temperature °C. | UV irradiation mJ/cm² |
| Example 1 | L-1/L-2 | A-1 | 12.5 | 1 | 2 | 0.30 | S-1 | 60 | 500 |
| Example 2 | L-1/L-2 | — | — | — | — | — | S-1 | 60 | 500 |
| Example 3 | L-1/L-2 | A-2 | 12.5 | 3 | 0 | 0.25 | S-1 | 60 | 500 |
| Example 4 | L-1/L-2 | A-2 | 12.5 | 3 | 0 | 0.25 | S-1 | 90 | 5,000 |
| Example 5 | L-1/L-2 | A-2 | 45.0 | 3 | 0 | 0.25 | S-1 | 60 | 500 |
| Example 6 | L-1/L-2 | A-2 | 12.5 | 3 | 0 | 0.25 | S-1 | 60 | 500 |
| | | B-1 | 10.0 | — | — | — | | | |
| Example 7 | L-1/L-2 | A-3 | 12.5 | 3 | 0 | 0.25 | S-1 | 60 | 500 |
| Example 8 | L-1/L-2 | A-4 | 12.5 | 1 | 2 | 0.25 | S-1 | 60 | 500 |
| Example 9 | L-1/L-2 | A-1 | 12.5 | 1 | 2 | 0.30 | IRGACURE184 | 60 | 500 |
| Example 10 | L-3 | A-2 | 12.5 | 3 | 0 | 0.25 | S-1 | 60 | 500 |
| Example 11 | L-4 | A-2 | 12.5 | 3 | 0 | 0.25 | S-1 | 60 | 500 |
| | | B-1 | 20.0 | — | — | — | | | |
| Example 12 | L-4 | A-2 | 45.0 | 3 | 0 | 0.25 | S-1 | 60 | 500 |
| Comparative Example 1 | L-1/L-2 | A-1 | 12.5 | 1 | 2 | 0.25 | S-1 | 35 | 500 |
| Comparative Example 2 | L-1/L-2 | A-5 | 12.5 | 3 | 0 | 0.71 | S-1 | 60 | 500 |
| Comparative Example 3 | L-1/L-2 | A-6 | 12.5 | 2 | 1 | 1.49 | S-1 | 60 | 500 |
| Comparative Example 4 | L-5/L-6 | A-1 | 12.5 | 1 | 2 | 0.25 | IRGACURE819 | 60 | 500 |
| Comparative Example 5 | L-4 | — | — | — | — | — | IRGACURE819 | 190 | 1,200 |

| | Re(450)/Re(550) | Density g/cm³ | Crosslinking point density mol/cm³ | Humidity and heat durability 60° C. Relative humidity 90% 1,000 hours | 85° C. Relative humidity 85% 240 hours |
|---|---|---|---|---|---|
| Example 1 | 0.87 | 1.22 | 0.0018 | A | C |
| Example 2 | 0.82 | 1.22 | 0.0017 | A | C |
| Example 3 | 0.90 | 1.25 | 0.0020 | A | B |
| Example 4 | 0.90 | 1.25 | 0.0019 | A | A |
| Example 5 | 1.01 | 1.28 | 0.0026 | A | A |
| Example 6 | 0.90 | 1.26 | 0.0028 | A | B |
| Example 7 | 0.90 | 1.25 | 0.0021 | A | B |
| Example 8 | 0.85 | 1.22 | 0.0020 | A | C |
| Example 9 | 0.90 | 1.24 | 0.0016 | A | C |
| Example 10 | 1.11 | 1.22 | 0.0022 | A | B |
| Example 11 | 0.92 | 1.20 | 0.0022 | A | B |
| Example 12 | 1.02 | 1.20 | 0.0030 | A | A |
| Comparative Example 1 | 0.87 | 1.24 | 0.0015 | B | D |
| Comparative Example 2 | 0.89 | 1.19 | 0.0020 | B | C |
| Comparative Example 3 | 0.85 | 1.18 | 0.0018 | B | D |
| Comparative Example 4 | 0.87 | 1.22 | 0.0013 | D | D |
| Comparative Example 5 | 0.85 | 1.20 | 0.0015 | D | D |

From the results shown in Table 1, it was found that in a case where the density of the optically anisotropic layer was less than 1.20 g/cm³, the durability was deteriorated (Comparative Examples 2 and 3).

In addition, it was found that in a case where the crosslinking point density of the optically anisotropic layer was less than 0.0016 mol/cm³, the durability was deteriorated (Comparative Examples 1, 4, and 5).

In contrast, it was found that in a case where the density of the optically anisotropic layer was 1.20 g/cm³ or more and the crosslinking point density was 0.0016 mol/cm³ or more, the durability was all satisfactory (Examples 1 to 13).

In addition, from the comparison of Example 3 and Example 9, it was found that in a case where the polymerization initiator was an oxime type polymerization initiator, the durability was more satisfactory.

EXPLANATION OF REFERENCES

10: optical film
12: optically anisotropic layer
14: alignment film
16: support
18: hard coat layer

What is claimed is:

1. An optical film comprising, at least:

an optically anisotropic layer, wherein the optically anisotropic layer is a layer obtained by polymerizing a polymerizable liquid crystal composition containing a liquid crystal compound represented by Formula (1) and a polymerization initiator, the optically anisotropic layer has a density of 1.20 g/cm³ or more and a crosslinking point density of 0.0016 mol/cm³ or more, and

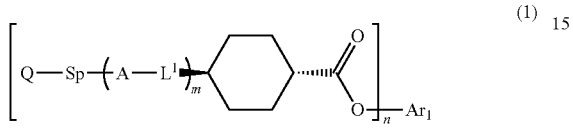

(1)

in Formula (1),

Ar¹ represents an n-valent aromatic group excluding the divalent aromatic ring group represented by the following formulas (II-3) and (II-4), L¹ represents a single bond, —COO—, or —OCO—, A represents an aromatic ring having 6 or more carbon atoms or a cycloalkylene ring having 6 or more carbon atoms, Sp represents a single bond, a linear or branched alkylene group having 1 to 12 carbon atoms, or a divalent linking group in which one or more —CH₂— groups that constitute a linear or branched alkylene group having 1 to 12 carbon atoms are substituted with —O—, —S—, —NH—, —N(Q)-, or —CO—, Q represents a polymerizable group, m represents an integer of 0 to 2, and n represents an integer of 1 or 2, where all of L, A, Sp, and Q, a plurality of which are provided depending on the number of m or n, may be the same or different from each other;

wherein the optically anisotropic layer satisfies Expression (I), $$0.75 \leq Re(450)/Re(550) \leq 1.00 \quad (I)$$

in Expression (I), Re(450) represents an in-plane retardation of the optically anisotropic layer at a wavelength of 450 nm, and Re(550) represents an in-plane retardation of the optically anisotropic layer at a wavelength of 550 nm,

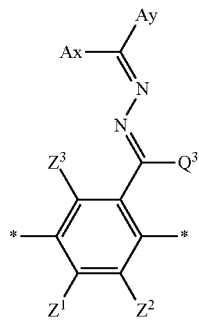

(II-3)

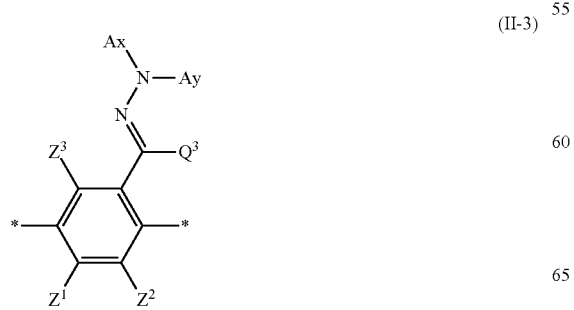

(II-4)

in Formulae (II-3) and (II-4), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —NR¹²R¹³, or —SR¹², $Z^1$ and $Z^2$ may be bonded to each other to form an aromatic ring or an aromatic heterocyclic ring, and $R^{12}$ and $R^{13}$ each independently represent a hydrogen atom or an alkyl group having 1 to 6 carbon atoms, Ax represents an organic group having 2 to 30 carbon atoms and having at least one aromatic ring selected from the group consisting of an aromatic hydrocarbon ring and an aromatic heterocyclic ring, Ay represents a hydrogen atom, an alkyl group having 1 to 6 carbon atoms which may have a substituent, or an organic group having 2 to 30 carbon atoms and having at least one aromatic ring selected from the group consisting of an aromatic hydrocarbon ring and an aromatic heterocyclic ring, $Q^3$ represents a hydrogen atom or an alkyl group having 1 to 6 carbon atoms which may have a substituent, and

* represents a bonding position.

2. The optical film according to claim 1, wherein the optically anisotropic layer has a density of 1.25 g/cm³ or more.

3. The optical film according to claim 1, wherein the polymerizable liquid crystal composition contains a polymerizable compound other than the liquid crystal compound represented by Formula (1).

4. The optical film according to claim 2, wherein the polymerizable liquid crystal composition contains a polymerizable compound other than the liquid crystal compound represented by Formula (1).

5. The optical film according to claim 3, wherein the polymerizable compound is a compound having a mesogen group.

6. The optical film according to claim 5, wherein the compound having a mesogen group has at least one ring structure selected from the group consisting of a benzene ring and a cyclohexane ring.

7. The optical film according to claim 5, wherein the number of cyclohexane rings in the compound having a mesogen group is 2 or less.

8. The optical film according to claim 6, wherein the number of cyclohexane rings in the compound having a mesogen group is 2 or less.

9. The optical film according to claim 6,
wherein the ring structure has a substituent having a van der Waals volume of 0.30 Å³ or less.
10. The optical film according to claim 7,
wherein the ring structure has a substituent having a van der Waals volume of 0.30 Å³ or less.
11. The optical film according to claim 1,
wherein the polymerization initiator is an oxime type polymerization initiator.
12. The optical film according to claim 2,
wherein the polymerization initiator is an oxime type polymerization initiator.
13. The optical film according to claim 3,
wherein the polymerization initiator is an oxime type polymerization initiator.
14. The optical film according to claim 5,
wherein the polymerization initiator is an oxime type polymerization initiator.
15. A polarizing plate comprising:
the optical film according to claim 1; and
a polarizer.
16. An image display device comprising:
the optical film according to claim 1; or
the polarizing plate according to claim 15.
17. An optical film comprising, at least:
an optically anisotropic layer,
wherein the optically anisotropic layer is a layer obtained by polymerizing a polymerizable liquid crystal composition containing a liquid crystal compound represented by Formula (1) and a polymerization initiator, and
the optically anisotropic layer has a density of 1.20 g/cm³ or more and a crosslinking point density of 0.0016 mol/cm³ or more,

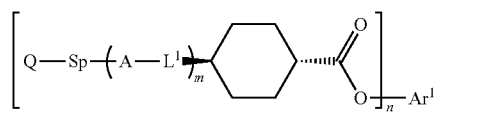
(1)

in Formula (1),
$Ar^1$ represents a divalent aromatic group represented by Formula (II-1) or (II-2),
$L^1$ represents a single bond, —COO—, or —OCO—,
A represents an aromatic ring having 6 or more carbon atoms or a cycloalkylene ring having 6 or more carbon atoms,
Sp represents a single bond, a linear or branched alkylene group having 1 to 12 carbon atoms, or a divalent linking group in which one or more —CH$_2$— groups that constitute a linear or branched alkylene group having 1 to 12 carbon atoms are substituted with —O—, —S—, —NH—, —N(Q)-, or —CO—,
Q represents a polymerizable group,
m represents an integer of 0 to 2, and
n represents an integer of 2,
where all of L, A, Sp, and Q, a plurality of which are provided depending on the number of m or n, may be the same or different from each other;

wherein the optically anisotropic layer satisfies Expression (I), $$0.75 \leq Re(450)/Re(550) \leq 1.00 \qquad (I)$$

in Expression (I), Re(450) represents an in-plane retardation of the optically anisotropic layer at a wavelength of 450 nm, and Re(550) represents an in-plane retardation of the optically anisotropic layer at a wavelength of 550 nm,

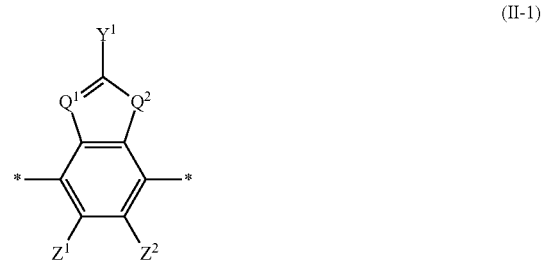
(II-1)

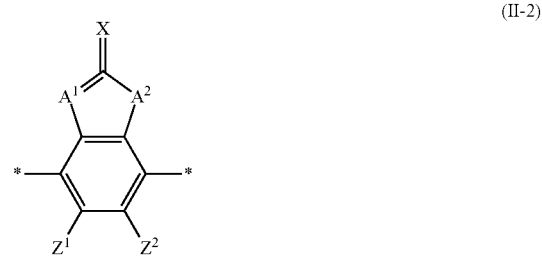
(II-2)

in Formula (II-1) to (II-2),
$Q^1$ represents N or CH, $Q^2$ represents —S—, —O—, or —NR$^{11}$—, R$^{11}$ represents a hydrogen atom or an alkyl group having 1 to 6 carbon atoms,
$Y^1$ represents an aromatic hydrocarbon group having 6 to 12 carbon atoms or an aromatic heterocyclic group having 3 to 12 carbon atoms,
$Z^1$, and $Z^2$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —NR$^{12}$R$^{13}$, —SR$^{12}$, $Z^1$ and $Z^2$ may be bonded to each other to form an aromatic ring or an aromatic heterocyclic ring, and R$^{12}$ and R$^{13}$ each independently represent a hydrogen atom or an alkyl group having 1 to 6 carbon atoms,
$A^1$ and $A^2$ each independently represent a group selected from the group consisting of —O—, —NR$^{21}$—, —S—, and —CO—, and R$^{21}$ represents a hydrogen atom or a substituent,
X represents a hydrogen atom or a non-metal atom of Groups 14 to 16 to which a substituent may be bonded, and
* represents a bonding position.

* * * * *